United States Patent [19]
Inadome

[11] Patent Number: 4,576,445
[45] Date of Patent: Mar. 18, 1986

[54] ZOOM LENS

[75] Inventor: Kiyotaka Inadome, Kawasaki, Japan

[73] Assignee: Nippon Kogaku K. K., Tokyo, Japan

[21] Appl. No.: 612,069

[22] Filed: May 18, 1984

[30] Foreign Application Priority Data

May 27, 1983 [JP] Japan .................................. 58-93648
May 27, 1983 [JP] Japan .................................. 58-93649

[51] Int. Cl.⁴ .......................... G02B 9/36; G02B 15/14
[52] U.S. Cl. ....................................... 350/427; 350/423
[58] Field of Search .............................. 350/423, 427

[56]                References Cited
           U.S. PATENT DOCUMENTS 4,192,577 11/1980 Ogino .
4,390,248  6/1983 Ikemori ............................... 350/427

FOREIGN PATENT DOCUMENTS 0161824 10/1982 Japan .................................. 350/423

*Primary Examiner*—John K. Corbin
*Assistant Examiner*—Rebecca D. Gass
*Attorney, Agent, or Firm*—Shapiro and Shapiro

[57]                    ABSTRACT

A zoom lens having a change-magnification range ranging from wide angle to telephoto comprises, in succession from the object side, first lens group of positive refractive power movable on the optical axis, a second lens group of negative refractive power fixed relative to the image plane at a determined position, a third lens group of negative refractive power movable on the optical axis, and a fourth lens group of positive refractive power movable on the optical axis. The first and fourth lens groups are moved toward the object side in linear fashion to change magnification from the wide angle end to the telephoto end while the third lens group is moved toward the object side at the same time in non-linear fashion to keep the image plane at the determined position.

17 Claims, 26 Drawing Figures

FIG. 1
PRIOR ART
FIG. 2
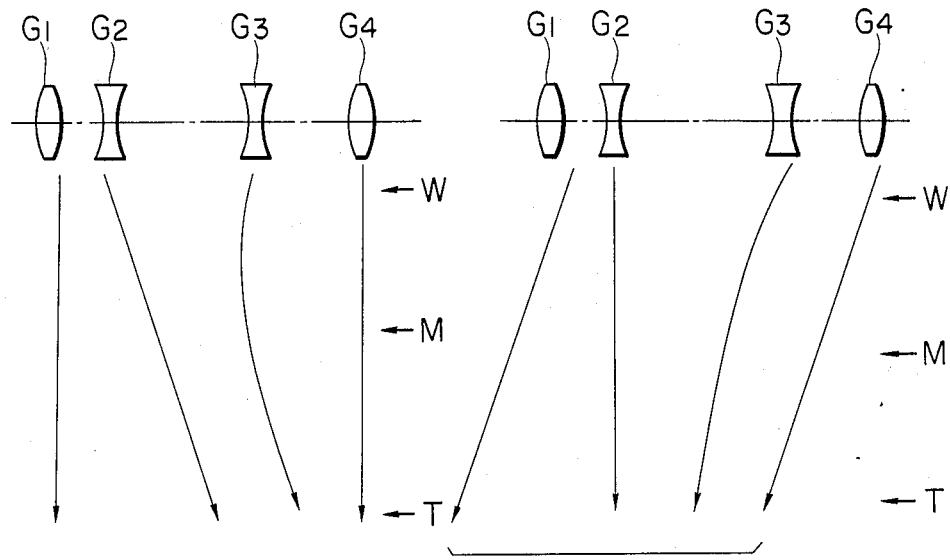
FIG. 3
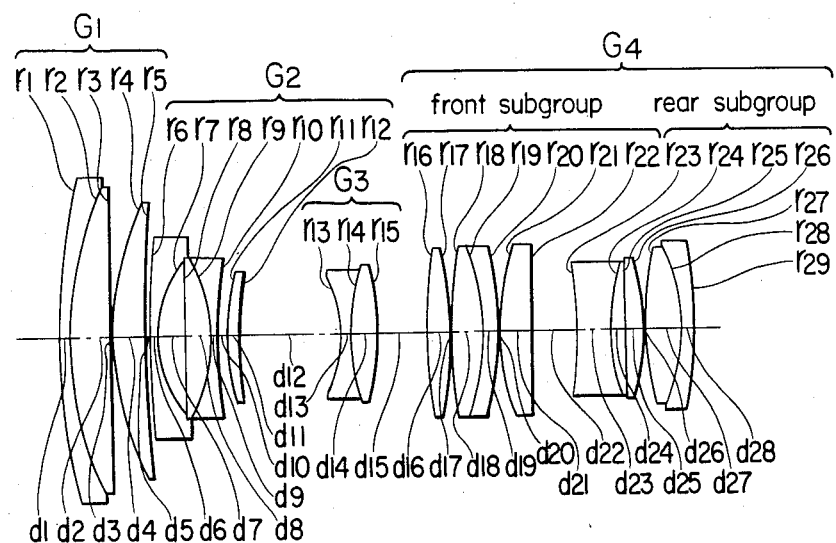

ZOOM LENS

BACKGROUND OF THE INVENTION

1. Field of the Invention

The present invention relates to a zoom lens of the type generally called the standard zoom lens which has a zoom range ranging from wide angle to telephoto with a standard focal length range therebetween.

2. Description of the Prior Art

As wide angle zoom lenses there have conventionally been used such zoom lenses consisting of two lens groups with a diverging lens group at the front of the zoom. The advantage of this type of zoom lens is that there is the possibility of substantial reduction in diameter of the front lens and also of better correction of aberrations at the wide angle end of the zoom range. However, this type of lens system is not suitable for the design of a zoom lens having a larger zoom ratio than 3:1 while covering even the telephoto side (the ratio of the maximum focal length to the minimum is called the zoom ratio).

If the zoom lens of the above-mentioned type is so made as to have a larger zoom ratio than 3:1, then aberrations such as spherical aberration and coma produced by the front diverging lens group are no longer completely corrected but remain as remaining aberrations which have adverse effect on the performance of the zoom lens in particular on the telephoto side of the zoom range.

Another basic form of zoom lens is of the type having a converging lens group as the front lens and consisting of three or four lens groups. In order to realize the desired small diameter of the front lens employing this type of the zoom lens it is required for each lens group of the zoom lens to have a stronger refractive power and also to be moved only a short distance for zooming. Even when these requirements are satisfied, the variation of aberrations with zooming becomes uncontrollably large. Therefore, in this case, it is difficult to reduce distortion, astigmatism and spherical aberration to acceptable level throughout the available zoom range. This difficulty becomes large in particular when it is desired to realize a compact zoom lens employing the basic form of zoom lens comprising three lens groups of positive, negative and positive or employing the basic form comprising four lens groups of positive, negative, positive and positive. By increasing the refractive power of each group to realize the compact design, the power of the negative lens group is rendered very strong and the above-mentioned difficulty in aberration control is markedly increased.

The difficulty is lessened when there is used such type of zoom lens comprising four lens groups of positive, negative, negative and positive. Since this type of zoom lens includes two positive lens groups and two negative lens groups among which the necessary power is apportioned, a compact zoom lens can be designed without sharing unreasonably large power to any particular one of the lens groups. In this case, therefore, it is possible to design the zoom lens more compact while moderating the difficulty in correcting aberrations.

Some standard zoom lenses employing the above basic form consisting of four lens groups of positive, negative, negative and positive have already been known and disclosed, for example, in Japanese Patent Application laid open No. sho-53-47,451 (the counterpart of which is U.S. Pat. No. 4,192,577) and Japanese Patent Application laid open No. Sho-56-48,607 (the counterpart of which is U.S. Pat. No. 4,390,248).

Although the share of power to each lens group has been reduced to some extent in these prior art lenses, they have still some problems to be solved. Firstly, the known zoom lenses still suffer from relatively large variation of aberrations with zooming. In particular the variation of astigmatism is large and that of distortion is markedly large. Secondly, the reduction in diameter of the front lens achieved by the prior art is relatively small. The zoom lenses proposed by the above-referred patents are not so compact to call them compact zoom lens. These drawbacks are particularly noticeable in the standard zoom lens having a zoom ratio large enough to cover the range of from wide angle side to telephoto side.

SUMMARY OF THE INVENTION

Accordingly, the object of the present invention is to solve the problems involved in the prior art zoom lenses as mentioned above and to enable a further reduction in size of the front lens, thereby providing a zoom lens which is compact as a whole and has improved performance at the same time.

Other objects, features and advantages of the present invention will appear more fully from reading the following description taken in connection with the accompanying drawings.

BRIEF DESCRIPTION OF THE DRAWINGS

FIG. 1 shows the movements of the four lens groups of a zoom lens according to the prior art;

FIG. 2 shows the movements of the four lens groups of the same type of zoom lens according to the present invention;

FIGS. 3, 4 and 5 show first, second and third embodiments of the invention respectively;

DETAILED DESCRIPTION OF THE PREFERRED EMBODIMENTS

Figure 4:
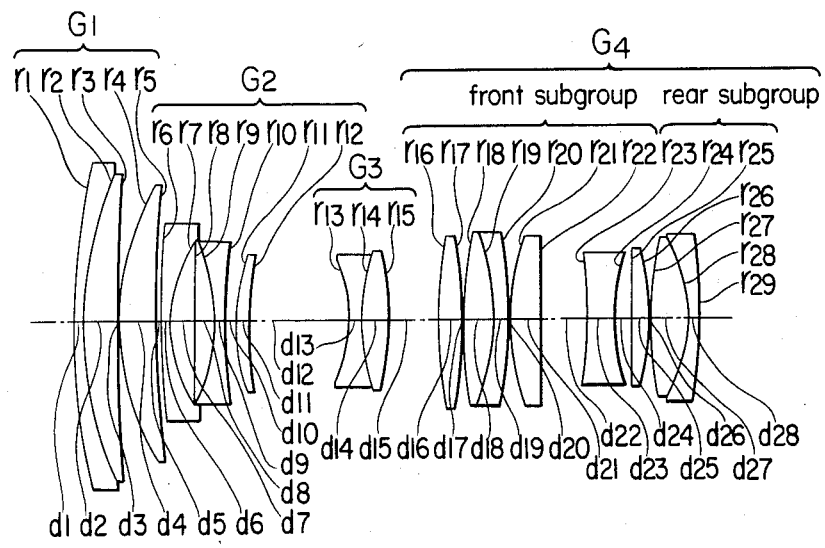

The present invention basically employs the above-mentioned configuration of zoom lens comprising four lens groups of positive, negative, negative and positive arranged in the named order from the object side. Employing this form of zoom lens, we have at first allocated the refractive power to the two positive lens groups and the two negative lens groups and then increased the power of each lens group in such manner that every lens group in the zoom lens bears a reasonable share of power. With the well-balanced power allotment, a new idea is incorporated into the zoom lens in respect of the manner of movements of the lens groups as will be described with reference to FIGS. 1 and 2.

FIG. 1 illustrates the manner of zoom movements of the lens groups according to prior art and FIG. 2 illustrates that according to the present invention. The zoom lenses shown in FIGS. 1 and 2 are of the same basic configuration comprising four lens groups of positive (G1), negative (G2), negative (G3) and positive (G4). But, they differ in zoom movement. Comparing FIG. 1 with FIG. 2 one can understand that the second negative lens group (G2) of the zoom lens according to the invention is not moved but remains stationary during zooming. The second negative lens group is the lens group which has the strongest refractive power of all the four groups. In the prior art zoom lens this second lens group is moved on the optical axis to vary the focal length (magnification) as shown in FIG. 1. Contrary to the prior art, the present invention forms the second lens group (G2) as a fixed lens group, which constitutes one of the most important features of the invention. Another feature is found in the function of the first and fourth lens groups (G1) and (G4). Conventionally, the first positive lens group (G1) functions as a focusing system and is moved solely to focus and the fourth positive lens group (G4) functions as a relay system and is fixed with respect to the image plane. According to the present invention, the first and fourth positive lens groups (G1) and (G4) are moved together toward the object side in linear fashion from wide angle side (W) to telephoto side (T) of the zoom range. Thus, in the zoom lens according to the invention, the fourth lens group functions also to vary the magnification. The displacement of the image plane caused thereby is compensated by moving the third negative lens group (G3) in non-linear fashion. Since the first and fourth lens groups (G1) and (G4) moving together toward the object side serve also a magnification-changing system, the present invention enables the first and fourth lens groups to bear their own shares in the function to vary the focal length. Therefore, according to the invention, the increase of zoom ratio can be realized without difficulty.

Furthermore, with the zoom movement according to the invention, the total lens length from the frontmost lens surface to the image plane changes as the first and fourth lens groups are together moved toward the object side. This change of total length takes place in the direction to lengthen it toward the telephoto side (T) from the wide angle side (W). In other words, the total length becomes lengthened on the telephoto side (T). This has an effect to lessen the problem of excessive telephoto ratio at the telephoto end which is usually produced by increasing the zoom ratio. The telephoto ratio is the ratio of the distance from the frontmost lens surface to the image plane to the focal length of the zoom lens. In general, the telephoto ratio becomes excess at the telephoto end when the zoom lens is designed to obtain a larger zoom ratio. More particularly, the telephoto ratio at the telephoto end is rendered too small to adequately correct aberrations. The present invention lessens the problem because the total length of the zoom lens can be lengthened on the telephoto side of the zoom range.

Other merits obtained by the present invention are as follows:

Since the aperture stop is moved together with the third lens group (G3) toward the object side by zooming, a further reduction in diameter of the front lens is possible.

The first and fourth lens groups (G1) and (G4) have linear movement. The second lens group (G2) which has the strongest power of all the four groups can be fixed. This zoom motion enables use of a simple moving mechanism for zooming while maintaining the necessary high accuracy of zooming operation.

In addition to the above features relating to the zoom movement, the zoom lens according to the present invention is characterized by its design. The zoom lens is designed to satisfy the following conditions, wherein $f_1$, $f_2$, $f_3$ and $f_4$ are focal lengths of the first, second, third and fourth lens groups, respectively:

$$2.7 < f_1/-f_2 \leq 3.0 \tag{1}$$

$$3.2 < f_3/f_2 < 3.9 \tag{2}$$

$$1.3 < f_4/-f_3 < 1.7 \tag{3}$$

These conditions are essential for achieving the compact form and aberration control of the zoom lens according to the invention.

If the lower limit of the condition (1) is exceeded, then the refractive power of the first lens group relative to the remaining groups becomes too strong to correct the astigmatism produced by the light rays of large incidence angle. In addition, the variation of spherical aberration by zooming becomes too large. If the upper limit is exceeded, the total length is increased and the principal rays pass the first lens group at points away from the optical axis although it may be advantageous for the correction of astigmatism and spherical aberration caused by zooming. Furthermore, the distance moved by focusing becomes larger which leads to the increase in diameter of the front lens.

If the lower limit of the condition (2) is exceeded, then, although the total length and the front lens diameter can be reduced, the space between the principal points of the second and third lens groups becomes too narrow on the telephoto side and at the same time the Petzval sum moves to negative. If the upper limit is exceeded, the space between the third and fourth lens groups becomes too narrow. The total length is increased and the principal rays go away from the optical axis. Therefore, in this case, it is required to increase the diameter of the front lens.

If the lower limit of the condition (3) is exceeded, then, although the total length becomes short, the space of the principal points of the third and fourth lens groups is rendered small to the extent to produce mechanical interference between the two lens groups on the telephoto side. If the upper limit is exceeded, it gives rise to the problem of increase in total length and sudden fall-down of the Petzval sum to negative.

It is preferable to design a zoom lens satisfying the above conditions and having a zoom ratio of about 3:1. In this zoom lens, the third lens group to compensate the displacement of the image plane by zooming moves monotonously in the same direction as the first and fourth lens groups. Therefore, in view of the cam mechanism needed, a further simplification of the structure may be realized, which makes the manufacture of the zoom lens easy and assists in maintaining high accuracy.

Among the three conditions (1), (2) and (3), the requirements represented by (1) and (2) are absolutely necessary for such zoom lens having a maximum view angle of about 60° and a zoom ratio of about 3:1. For a zoom lens having a maximum view angle larger than 70° and a zoom ratio of about 3.5:1 to 4.5:1 the following conditions should be satisfied in place of the above conditions (1) and (2) for attaining the compact structure and adequate aberration control:

$$3.0 < f_1/-f_2 < 3.3 \tag{1'}$$

$$3.9 \leq f_3/f_2 < 4.4 \quad (2')$$

As previously noted, in the zoom lens according to the invention, the first and fourth lens groups are together moved toward the object side. The function representing the relation between the two groups may be variously determined from a structural point of view or in view of aberration correction. If the aberration correction can be attained by elaborately designing the respective structures of the lens groups, then as the function there may be used a very simple one, for example, a constant. In this case, the zoom lens can be further simplified in structure. Furthermore, by setting the link constant to 1, that is to say, by moving the first and fourth lens groups as a unitary body a further simplification of the structure may be achieved, which will lead to a further improvement of accuracy in zooming operation.

In the above basic configuration according to the invention, the individual lens groups have the following structures.

The first lens group of positive power (G1) is composed of two components, a cemented positive lens and a positive lens arranged in this order from the object side. It is desirable for the first lens group to satisfy the condition $$1.1 < f_{13}/f_1 < 1.6 \quad (4)$$

wherein, $f_{13}$ is the focal length of the positive lens on the image side and $f_1$ is the composite focal length of the first lens group.

The cemented lens is formed as a positive lens gently curved on the image side and the final positive lens has a meniscus shape convex toward the object side. With this shape, the off-axis rays incident on each lens are not heavily refracted and therefore the generation of high-order spherical aberration is reduced. If the lower limit of the condition (4) is exceeded, the refractive power of the meniscus positive lens on the image side becomes too strong to correct aberration due to the large variation of spherical aberration and astigmatism by zooming. If the upper limit is exceeded, then the refractive power of the cemented lens becomes too large. Therefore, a larger diameter of the front lens is needed. Also, high-order aberrations are produced so that the satisfactory correction of aberrations is no longer possible.

For such a zoom lens having a maximum view angle larger than 70° and a zoom ratio of about 3.5:1 to 4.5:1 it is particularly desirable to satisfy the condition, $$1.05 < f_{13}/f_1 < 1.5 \quad (4')$$

The second lens group of negative power (G2) is composed of a negative meniscus lens convex toward the object side, a cemented lens having negative refractive power and a positive meniscus lens convex toward the object side. Preferred second lens group (G2) satisfies the following conditions:

$$-2.0 \leq \frac{r_7 + r_6}{r_7 - r_6} \leq -1.0 \quad (5)$$

$$-0.1 < f_{ab}\left(\frac{1}{f_{a}v_a} + \frac{1}{f_{b}v_b}\right) < -0.01 \quad (6)$$

$$3.0 < \frac{r_{12} + r_{11}}{r_{12} - r_{11}} < 20.0 \quad (7)$$

wherein, $r_6, r_7, \ldots, r_{12}$ are the curvature radii of the lens surfaces in the second group, the affixed ordinal numbers being from the first group side; $f_a$ and $f_b$ are focal lengths of the positive and negative lenses constituting the cemented lens; $v_a$ and $v_b$ are Abbe's numbers thereof; and $f_{ab}$ is the composite focal length of the lens.

The condition (5) limits the degree of bending of the negative meniscus lens located the nearest to the object side among the lenses of the second group. After passing through the first lens group the marginal rays are incident on the second lens group at a large incidence angle and then they are refracted strongly by the second group. For this reason, it is desired that the second group should be designed to satisfy the condition (5). Otherwise, there arises difficulty in the correction of astigmatism due to the generation of high-order aberrations. Furthermore, the variation of spherical aberration by zooming may become too large to correct. This constitutes an obstacle against the realization of the compact zoom lens. The condition (6) is essential for the effective and reasonable control of chromatic aberrations produced by the respective lens surfaces strongly curved for the purpose of a compact design. The condition (6) is important, in particular, for the correction of color aberration produced by magnification. The condition (7) defines the degree of bending of the positive meniscus lens required to correct the spherical aberration on the telephoto side.

For such a zoom lens having a maximum view angle larger than 70° and a zoom ratio of about 3.5:1 to 4.5:1, it is particularly preferable to satisfy the following conditions:

$$-0.1 \leq f_{ab}\left(\frac{1}{f_{a}v_a} + \frac{1}{f_{b}v_b}\right) < 0 \quad (6')$$

$$1.5 \leq \frac{r_{12} + r_{11}}{r_{12} - r_{11}} \leq 10 \quad (7')$$

The third lens group of negative power (G3) is composed of a biconcave lens and a biconvex lens cemented together. It is desirable for the third lens group to satisfy the condition, $$1.5 < \frac{r_{15} + r_{13}}{r_{15} - r_{13}} < 4.0 \quad (8)$$

wherein, $r_{13}$, $r_{14}$ and $r_{15}$ are the curvature radii of the respective lens surfaces, the affixed ordinal numbers being from the second group side.

This condition formula (8) defines the bending of the cemented negative lens as the third lens group. When this condition (8) is satisfied, the variation of spherical aberration by zooming can be stabilized and also the coma aberration can be symmetrized.

The fourth lens group of positive power (G4) is constituted of a positive front subgroup and a negative rear subgroup. The front subgroup is composed of three components, a biconvex lens, a cemented achromatic positive lens and a biconvex lens arranged in this order from the object side, the composite refractive power being positive. The rear subgroup is composed of three components, a biconcave lens, a positive lens and a positive cemented lens of a positive refractive power arranged in this order from the front group side, the composite refractive power of the rear subgroup being negative.

As for the front subgroup it is desirable to satisfy the following conditions:

$$0.002 < \frac{n_{11} - n_{12}}{r_{19}} < 0.02 \qquad (9)$$

$$0.4 < \frac{r_{22} + r_{21}}{r_{22} - r_{21}} < 1.0 \qquad (10)$$

wherein, $r_{19}$ is the curvature radius of the cemented surface in the front subgroup; $n_{11}$ and $n_{12}$ are refractive indexes of the positive and negative lenses before and after the cemented surface; and $r_{21}$ and $r_{22}$ are the curvature radii of the rearmost positive lens in the front subgroup.

The condition (9) defines the value representing the refractive power of the cemented surface. When this condition is satisfied, a well-balanced correction of coma aberration as well as of chromatic aberration is possible. If the condition is not satisfied, the coma and the spherical aberration in color can not be corrected at the same time. The condition (10) defines the bending of the rearmost positive lens of the front subgroup. This conditional formula (10) is useful for the correction of the variation of spherical aberration by zooming, and it is of significance in particular when it is wished to obtain a brighter, F-number at maximum aperture for the telephoto side.

As for the rear subgroup of the fourth lens group it is desirable to satisfy the following conditions:

$$0.08 < d/f_4 \qquad (11)$$

$$-0.9 < \frac{r_{24} + r_{23}}{r_{24} - r_{23}} < -0.4 \qquad (12)$$

$$0.002 < \frac{n_{16} - n_{17}}{r_{28}} < 0.02 \qquad (13)$$

wherein, $r_{23}$ is the curvature radius on the object side of the biconcave negative lens of the rear subgroup and $r_{24}$ is the curvature radius on the image side of the same; d is the thickness of the lens; $n_{16}$ and $n_{17}$ are refractive indexes of the positive and negative lenses constituting the positive cemented lens on the image side and $r_{28}$ is the curvature radius of the cemented surface.

The spherical aberration is reduced when the condition (11) is satisfied. The condition (12) defines the bending of the negative lens of the rear subgroup on the object side. If the condition (12) is not satisfied, it is difficult to correct astigmatism and coma in a well-balanced manner. The condition (13) defines the refractive power of the rearmost cemented surface required to correct the coma aberration.

Within the scope of the invention it is possible to make a zoom lens having a zoom ratio of about 3:1 or larger. However, in the preferred embodiments described above, there has been employed such zoom range in which the movement of the third lens group functioning as a compensation system during zooming is in the same direction as the first and fourth lens groups move. The reason for this is that high accuracy of zooming operation can be assured by it. In addition, for the sake of simple movement, the relation between the first and fourth lens groups has been determined so as to be always 1:1. In other words, as the link constant there has been employed "1".

In order to illustrate the present invention the numerical data of first, second and third embodiments of the invention are shown in the following table as Examples 1, 2 and 3. Affixed numbers in the table indicate the order of components as viewed from the object side. The refractive index given in the table is the value for the d-ray ($\lambda = 587.6$ nm).

EXAMPLE 1 f = 36.0~102 mm    F 3.36~4.60

| Curvature radius | Lens thickness at the center and spacing between lenses | Refractive index | Abbe's number |
|---|---|---|---|
| $r_1 = 95.772$ | $d_1 = 1.100$ | $n_1 = 1.86074$ | $\nu_1 = 23.0$ |
| $r_2 = 49.000$ | $d_2 = 5.900$ | $n_2 = 1.56384$ | $\nu_2 = 60.8$ |
| $r_3 = -8000.000$ | $d_3 = .200$ | | |
| $r_4 = 37.460$ | $d_4 = 5.200$ | $n_3 = 1.61025$ | $\nu_3 = 56.7$ |
| $r_5 = 202.222$ | $d_5 = .378$ | | |
| $r_6 = 162.000$ | $d_6 = .900$ | $n_4 = 1.79631$ | $\nu_4 = 41.0$ |
| $r_7 = 17.080$ | $d_7 = 4.300$ | | |
| $r_8 = -800.000$ | $d_8 = 3.500$ | $n_5 = 1.78470$ | $\nu_5 = 26.1$ |
| $r_9 = -23.000$ | $d_9 = .900$ | $n_6 = 1.78797$ | $\nu_6 = 47.5$ |
| $r_{10} = 67.500$ | $d_{10} = 1.200$ | | |
| $r_{11} = 27.500$ | $d_{11} = 1.600$ | $n_7 = 1.78470$ | $\nu_7 = 26.1$ |
| $r_{12} = 39.227$ | $d_{12} = 15.236$ | | |
| $r_{13} = -19.850$ | $d_{13} = 1.000$ | $n_8 = 1.69680$ | $\nu_8 = 55.6$ |
| $r_{14} = 28.960$ | $d_{14} = 3.800$ | $n_9 = 1.79631$ | $\nu_9 = 41.0$ |
| $r_{15} = -47.254$ | $d_{15} = 7.566$ | | |
| $r_{16} = 84.552$ | $d_{16} = 3.000$ | $n_{10} = 1.62041$ | $\nu_{10} = 60.4$ |
| $r_{17} = -69.613$ | $d_{17} = .200$ | | |
| $r_{18} = 68.528$ | $d_{18} = 5.500$ | $n_{11} = 1.60729$ | $\nu_{11} = 59.6$ |
| $r_{19} = -23.930$ | $d_{19} = .900$ | $n_{12} = 1.79504$ | $\nu_{12} = 28.6$ |
| $r_{20} = -72.251$ | $d_{20} = .200$ | | |
| $r_{21} = 36.118$ | $d_{21} = 5.100$ | $n_{13} = 1.62041$ | $\nu_{13} = 60.4$ |
| $r_{22} = -434.489$ | $d_{22} = 6.300$ | | |
| $r_{23} = -138.000$ | $d_{23} = 4.800$ | $n_{14} = 1.79631$ | $\nu_{14} = 41.0$ |
| $r_{24} = 25.051$ | $d_{24} = 2.400$ | | |
| $r_{25} = 191.183$ | $d_{25} = 2.500$ | $n_{15} = 1.46450$ | $\nu_{15} = 65.8$ |
| $r_{26} = -41.895$ | $d_{26} = .200$ | | |
| $r_{27} = 37.500$ | $d_{27} = 5.900$ | $n_{16} = 1.51118$ | $\nu_{16} = 50.9$ |
| $r_{28} = -21.535$ | $d_{28} = 1.000$ | $n_{17} = 1.79668$ | $\nu_{17} = 45.5$ |
| $r_{29} = -118.497$ | | | |

| f | 36.000 | 60.596 | 101.999 |
|---|---|---|---|
| $d_5$ | .378 | 9.622 | 17.933 |
| $d_{12}$ | 15.236 | 8.495 | 3.810 |
| $d_{15}$ | 7.566 | 5.063 | 1.438 |
| $B_f$ | 46.929 | 56.173 | 64.483 |

$f_1 = 61.495$     $f_1/-f_2 = 2.872$
$f_2 = -21.410$
$f_3 = -75.361$     $f_3/f_2 = 3.520$
$f_4 = 28.261$     $f_4/-f_2 = 1.320$

EXAMPLE 2 f = 36.0~102 mm    F 3.34~4.62

| Curvature radius | Lens thickness at the center and spacing between lenses | Refractive index | Abbe's number |
|---|---|---|---|
| $r_1 = 96.162$ | $d_1 = 1.100$ | $n_1 = 1.86074$ | $\nu_1 = 23.0$ |
| $r_2 = 48.600$ | $d_2 = 5.800$ | $n_2 = 1.62280$ | $\nu_2 = 57.0$ |
| $r_3 = 791.454$ | $d_3 = .200$ | | |
| $r_4 = 38.500$ | $d_4 = 5.200$ | $n_3 = 1.62041$ | $\nu_3 = 60.3$ |
| $r_5 = 201.163$ | $d_5 = .346$ | | |
| $r_6 = 145.000$ | $d_6 = .900$ | $n_4 = 1.84042$ | $\nu_4 = 43.3$ |
| $r_7 = 17.132$ | $d_7 = 4.300$ | | |
| $r_8 = -293.874$ | $d_8 = 3.200$ | $n_5 = 1.80518$ | $\nu_5 = 25.4$ |
| $r_9 = -24.200$ | $d_9 = .900$ | $n_6 = 1.78797$ | $\nu_6 = 47.5$ |
| $r_{10} = 93.157$ | $d_{10} = 1.300$ | | |
| $r_{11} = 26.000$ | $d_{11} = 1.700$ | $n_7 = 1.80518$ | $\nu_7 = 25.4$ |
| $r_{12} = 34.047$ | $d_{12} = 15.248$ | | |

EXAMPLE 2-continued

| f = 36.0~102 mm | | F 3.34~4.62 | |
|---|---|---|---|
| $r_{13} = -19.458$ | $d_{13} = 1.000$ | $n_8 = 1.69680$ | $\nu_8 = 55.6$ |
| $r_{14} = 29.430$ | $d_{14} = 3.800$ | $n_9 = 1.79631$ | $\nu_9 = 41.0$ |
| $r_{15} = -45.453$ | $d_{15} = 7.529$ | | |
| $r_{16} = 82.943$ | $d_{16} = 3.000$ | $n_{10} = 1.62041$ | $\nu_{10} = 60.3$ |
| $r_{17} = -70.737$ | $d_{17} = .200$ | | |
| $r_{18} = 69.486$ | $d_{18} = 5.500$ | $n_{11} = 1.62299$ | $\nu_{11} = 58.2$ |
| $r_{19} = -23.703$ | $d_{19} = .900$ | $n_{12} = 1.79504$ | $\nu_{12} = 28.6$ |
| $r_{20} = -77.225$ | $d_{20} = .200$ | | |
| $r_{21} = 36.035$ | $d_{21} = 5.200$ | $n_{13} = 1.62041$ | $\nu_{13} = 60.3$ |
| $r_{22} = -466.547$ | $d_{22} = 6.400$ | | |
| $r_{23} = -159.000$ | $d_{23} = 4.000$ | $n_{14} = 1.87739$ | $\nu_{14} = 38.1$ |
| $r_{24} = 26.496$ | $d_{24} = 2.400$ | | |
| $r_{25} = 156.352$ | $d_{25} = 2.500$ | $n_{15} = 1.51680$ | $\nu_{15} = 64.1$ |
| $r_{26} = -42.344$ | $d_{26} = .200$ | | |
| $r_{27} = 40.144$ | $d_{27} = 5.900$ | $n_{16} = 1.54814$ | $\nu_{16} = 45.9$ |
| $r_{28} = -20.693$ | $d_{28} = 1.000$ | $n_{17} = 1.79668$ | $\nu_{17} = 45.5$ |
| $r_{29} = -181.842$ | | | |

| f | 36.000 | 60.596 | 101.999 |
|---|---|---|---|
| $d_5$ | .346 | 9.590 | 17.901 |
| $d_{12}$ | 15.249 | 8.507 | 3.822 |
| $d_{15}$ | 7.529 | 5.026 | 1.401 |
| $B_f$ | 47.562 | 56.805 | 65.116 |

$f_1 = 61.495$   $f_1/-f_2 = 2.872$
$f_2 = -21.410$
$f_3 = -75.361$   $f_3/f_2 = 3.520$
$f_4 = 28.261$   $f_4/-f_2 = 1.320$

EXAMPLE 3

| f = 36.0~102 mm | | F 3.57 | |
|---|---|---|---|
| Curvature radius | Lens thickness at the center and spacing between lenses | Refractive index | Abbe's number |
| $r_1 = 126.000$ | $d_1 = 1.200$ | $n_1 = 1.86074$ | $\nu_1 = 23.0$ |
| $r_2 = 53.800$ | $d_2 = 8.500$ | $n_2 = 1.56883$ | $\nu_2 = 56.0$ |
| $r_3 = -715.000$ | $d_3 = .200$ | | |
| $r_4 = 43.500$ | $d_4 = 6.600$ | $n_3 = 1.69350$ | $\nu_3 = 53.8$ |
| $r_5 = 227.997$ | $d_5 = .610$ | | |
| $r_6 = 198.000$ | $d_6 = .900$ | $n_4 = 1.84042$ | $\nu_4 = 43.3$ |
| $r_7 = 19.300$ | $d_7 = 5.000$ | | |
| $r_8 = 684.623$ | $d_8 = 4.400$ | $n_5 = 1.78470$ | $\nu_5 = 26.1$ |
| $r_9 = -23.800$ | $d_9 = .900$ | $n_6 = 1.78797$ | $\nu_6 = 47.5$ |
| $r_{10} = 82.500$ | $d_{10} = .900$ | | |
| $r_{11} = 26.000$ | $d_{11} = 1.800$ | $n_7 = 1.80518$ | $\nu_7 = 25.4$ |
| $r_{12} = 30.823$ | $d_{12} = 16.389$ | | |
| $r_{13} = -21.780$ | $d_{13} = 1.000$ | $n_8 = 1.69350$ | $\nu_8 = 53.8$ |
| $r_{14} = 32.384$ | $d_{14} = 5.400$ | $n_9 = 1.79631$ | $\nu_9 = 41.0$ |
| $r_{15} = -53.850$ | $d_{15} = 9.570$ | | |
| $r_{16} = 99.366$ | $d_{16} = 3.800$ | $n_{10} = 1.62041$ | $\nu_{10} = 60.4$ |
| $r_{17} = -74.780$ | $d_{17} = .200$ | | |
| $r_{18} = 77.588$ | $d_{18} = 7.100$ | $n_{11} = 1.56384$ | $\nu_{11} = 60.8$ |
| $r_{19} = -27.224$ | $d_{19} = 1.000$ | $n_{12} = 1.79504$ | $\nu_{12} = 28.6$ |
| $r_{20} = -67.643$ | $d_{20} = .200$ | | |
| $r_{21} = 32.846$ | $d_{21} = 5.600$ | $n_{13} = 1.48749$ | $\nu_{13} = 70.2$ |
| $r_{22} = -265.336$ | $d_{22} = 7.100$ | | |
| $r_{23} = -151.036$ | $d_{23} = 5.500$ | $n_{14} = 1.80454$ | $\nu_{14} = 39.6$ |
| $r_{24} = 29.181$ | $d_{24} = 2.600$ | | |
| $r_{25} = 690.119$ | $d_{25} = 2.700$ | $n_{15} = 1.62041$ | $\nu_{15} = 60.4$ |
| $r_{26} = -50.204$ | $d_{26} = .200$ | | |
| $r_{27} = 41.405$ | $d_{27} = 7.100$ | $n_{16} = 1.51118$ | $\nu_{16} = 50.9$ |
| $r_{28} = -22.753$ | $d_{28} = 1.000$ | $n_{17} = 1.78797$ | $\nu_{17} = 47.5$ |
| $r_{29} = -149.953$ | | | |

| f | 36.000 | 60.597 | 102.000 |
|---|---|---|---|
| $d_5$ | .610 | 10.380 | 19.153 |
| $d_{12}$ | 16.389 | 10.103 | 5.687 |
| $d_{15}$ | 9.570 | 6.086 | 1.728 |
| $B_f$ | 47.438 | 57.208 | 65.981 |

$f_1 = 65.935$   $f_1/-f_2 = 2.912$
$f_2 = -22.640$
$f_3 = -81.504$   $f_3/f_2 = 3.600$
$f_4 = 31.288$   $f_4/-f_2 = 1.382$

The above examples are zoom lenses for 35 mm single lens reflex cameras and have a zoom ratio of about 3:1 with the focal length, f=36-102 mm amply covering the range from wide angle to subtelephoto. F-number is 3.4-4.6 for the examples 1 and 2 and about 3.5 for the example 3 over the zoom range. The zoom lenses are compact in view of not only front lens diameter but also total length. The size of the filter mounted on the front-most part of the lens system is only 52 mm for the examples 1 and 2. For the example 3 the filter size is 62 mm which is very small for its F-number of 3.5 throughout the zoom range.

Further embodiments of the present invention are shown as Examples 4, 5 and 6 in the following data table. The Examples 4 and 5 show zoom lenses adaptable for 35 mm single lens reflex cameras. They are of large zoom ratio of 3.5:1 with the focal length, f=28.8-102 mm amply covering the range from wide angle to telephoto. F-number is 4.05. The Example 6 also shows a zoom lens of large zoom ratio which is 4.5:1 with the focal length, f=28.8-131 mm and F-number of 4.14 to 4.65.

EXAMPLE 4

| f = 28.8~102 mm | | F = 4.05 | |
|---|---|---|---|
| Curvature radius | Lens thickness at the center and spacing between lenses | Refractive index | Abbe's number |
| $r_1 = 120.000$ | $d_1 = 1.100$ | $n_1 = 1.86074$ | $\nu_1 = 23.0$ |
| $r_2 = 56.000$ | $d_2 = 9.800$ | $n_2 = 1.51860$ | $\nu_2 = 70.1$ |
| $r_3 = -335.000$ | $d_3 = .200$ | | |
| $r_4 = 39.380$ | $d_4 = 5.900$ | $n_3 = 1.74810$ | $\nu_3 = 52.3$ |
| $r_5 = 145.652$ | $d_5 = .347$ | | |
| $r_6 = 133.863$ | $d_6 = .800$ | $n_4 = 1.90265$ | $\nu_4 = 35.8$ |
| $r_7 = 16.680$ | $d_7 = 4.600$ | | |
| $r_8 = 250.000$ | $d_8 = 4.300$ | $n_5 = 1.80518$ | $\nu_5 = 25.4$ |
| $r_9 = -22.400$ | $d_9 = .800$ | $n_6 = 1.77279$ | $\nu_6 = 49.4$ |
| $r_{10} = 43.787$ | $d_{10} = .200$ | | |
| $r_{11} = 24.096$ | $d_{11} = 1.500$ | $n_7 = 1.80518$ | $\nu_7 = 25.4$ |
| $r_{12} = 35.680$ | $d_{12} = 13.196$ | | |
| $r_{13} = -18.970$ | $d_{13} = 1.000$ | $n_8 = 1.69350$ | $\nu_8 = 53.8$ |
| $r_{14} = 31.000$ | $d_{14} = 5.300$ | $n_9 = 1.79631$ | $\nu_9 = 41.0$ |
| $r_{15} = -43.440$ | $d_{15} = 12.186$ | | |
| $r_{16} = 89.634$ | $d_{16} = 3.400$ | $n_{10} = 1.62041$ | $\nu_{10} = 60.3$ |
| $r_{17} = -71.095$ | $d_{17} = .200$ | | |
| $r_{18} = 70.847$ | $d_{18} = 5.800$ | $n_{11} = 1.56384$ | $\nu_{11} = 60.8$ |
| $r_{19} = -25.131$ | $d_{19} = .900$ | $n_{12} = 1.79504$ | $\nu_{12} = 28.6$ |
| $r_{20} = -63.760$ | $d_{20} = .200$ | | |
| $r_{21} = 28.913$ | $d_{21} = 5.200$ | $n_{13} = 1.46450$ | $\nu_{13} = 65.8$ |
| $r_{22} = -281.627$ | $d_{22} = 6.600$ | | |
| $r_{23} = -179.055$ | $d_{23} = 4.900$ | $n_{14} = 1.90265$ | $\nu_{14} = 35.8$ |
| $r_{24} = 28.281$ | $d_{24} = 2.100$ | | |
| $r_{25} = 183.000$ | $d_{25} = 3.600$ | $n_{15} = 1.51454$ | $\nu_{15} = 54.6$ |
| $r_{26} = -35.445$ | $d_{26} = .200$ | | |
| $r_{27} = 36.991$ | $d_{27} = 8.000$ | $n_{16} = 1.51118$ | $\nu_{16} = 50.9$ |
| $r_{28} = -21.003$ | $d_{28} = .900$ | $n_{17} = 1.78797$ | $\nu_{17} = 47.5$ |
| $r_{29} = -258.281$ | | | |

| f | 28.800 | 54.011 | 102.000 |
|---|---|---|---|
| $d_5$ | .347 | 10.882 | 20.229 |
| $d_{12}$ | 13.196 | 7.288 | 3.783 |
| $d_{15}$ | 12.186 | 7.559 | 1.717 |
| $B_f$ | 38.357 | 48.891 | 58.239 |

$f_1 = 59.924$   $f_1/-f_2 = 3.039$
$f_2 = -19.716$
$f_3 = -79.060$   $f_3/f_2 = 4.010$
$f_4 = 28.884$   $f_4/-f_2 = 1.465$

EXAMPLE 5

| f = 28.8~102 mm | | F = 4.05 | |
|---|---|---|---|
| Curvature | Lens thickness at the center and spacing bet- | Refractive | Abbe's |

EXAMPLE 5-continued

| f = 28.8~102 mm | | F = 4.05 | |
|---|---|---|---|
| radius | ween lenses | index | number |
| $r_1 = 115.600$ | $d_1 = 1.100$ | $n_1 = 1.90837$ | $v_1 = 23.2$ |
| $r_2 = 55.900$ | $d_2 = 9.800$ | $n_2 = 1.51860$ | $v_2 = 70.1$ |
| $r_3 = -334.000$ | $d_3 = .200$ | | |
| $r_4 = 39.185$ | $d_4 = 5.900$ | $n_3 = 1.74810$ | $v_3 = 52.3$ |
| $r_5 = 147.595$ | $d_5 = .437$ | | |
| $r_6 = 134.500$ | $d_6 = .800$ | $n_4 = 1.90265$ | $v_4 = 35.8$ |
| $r_7 = 16.700$ | $d_7 = 4.600$ | | |
| $r_8 = 280.000$ | $d_8 = 4.300$ | $n_5 = 1.80518$ | $v_5 = 25.4$ |
| $r_9 = -22.400$ | $d_9 = .800$ | $n_6 = 1.77279$ | $v_6 = 49.4$ |
| $r_{10} = 43.050$ | $d_{10} = .200$ | | |
| $r_{11} = 24.520$ | $d_{11} = 1.500$ | $n_7 = 1.80518$ | $v_7 = 25.4$ |
| $r_{12} = 37.636$ | $d_{12} = 13.117$ | | |
| $r_{13} = -19.040$ | $d_{13} = 1.000$ | $n_8 = 1.69350$ | $v_8 = 53.8$ |
| $r_{14} = 31.000$ | $d_{14} = 5.300$ | $n_9 = 1.79631$ | $v_9 = 41.0$ |
| $r_{15} = -43.707$ | $d_{15} = 12.227$ | | |
| $r_{16} = 89.600$ | $d_{16} = 3.400$ | $n_{10} = 1.62041$ | $v_{10} = 60.4$ |
| $r_{17} = -71.400$ | $d_{17} = .200$ | | |
| $r_{18} = 71.013$ | $d_{18} = 5.800$ | $n_{11} = 1.56384$ | $v_{11} = 60.8$ |
| $r_{19} = -25.131$ | $d_{19} = .900$ | $n_{12} = 1.79504$ | $v_{12} = 28.6$ |
| $r_{20} = -63.932$ | $d_{20} = .200$ | | |
| $r_{21} = 28.859$ | $d_{21} = 5.200$ | $n_{13} = 1.46450$ | $v_{13} = 65.8$ |
| $r_{22} = -272.280$ | $d_{22} = 6.600$ | | |
| $r_{23} = -182.586$ | $d_{23} = 4.900$ | $n_{14} = 1.87739$ | $v_{14} = 38.1$ |
| $r_{24} = 27.644$ | $d_{24} = 2.100$ | | |
| $r_{25} = 199.205$ | $d_{25} = 3.600$ | $n_{15} = 1.51860$ | $v_{15} = 70.1$ |
| $r_{26} = -36.907$ | $d_{26} = .200$ | | |
| $r_{27} = 36.980$ | $d_{27} = 8.000$ | $n_{16} = 1.51118$ | $v_{16} = 50.9$ |
| $r_{28} = -21.004$ | $d_{28} = .900$ | $n_{17} = 1.78797$ | $v_{17} = 47.5$ |
| $r_{29} = -233.437$ | | | |

| f | 28.800 | 54.011 | 102.000 |
|---|---|---|---|
| $d_5$ | .437 | 10.972 | 20.319 |
| $d_{12}$ | 13.117 | 7.209 | 3.704 |
| $d_{15}$ | 12.227 | 7.599 | 1.758 |
| $B_f$ | 38.312 | 48.846 | 58.193 |

$f_1 = 59.924$  $f_1/-f_2 = 3.039$
$f_2 = -19.716$
$f_3 = -79.060$  $f_3/f_2 = 4.010$
$f_4 = 28.884$  $f_4/-f_2 = 1.465$

EXAMPLE 6

| f = 28.8~131 mm | | F = 4.14~4.65 | |
|---|---|---|---|
| Curvature radius | Lens thickness at the center and spacing between lenses | Refractive index | Abbe's number |
| $r_1 = 124.332$ | $d_1 = 1.100$ | $n_1 = 1.86074$ | $v_1 = 23.0$ |
| $r_2 = 56.300$ | $d_2 = 9.600$ | $n_2 = 1.56384$ | $v_2 = 60.8$ |
| $r_3 = -390.000$ | $d_3 = .200$ | | |
| $r_4 = 40.000$ | $d_4 = 5.500$ | $n_3 = 1.69680$ | $v_3 = 55.6$ |
| $r_5 = 141.068$ | $d_5 = .251$ | | |
| $r_6 = 120.614$ | $d_6 = .800$ | $n_4 = 1.87739$ | $v_4 = 38.1$ |
| $r_7 = 17.104$ | $d_7 = 4.600$ | | |
| $r_8 = 178.353$ | $d_8 = 4.200$ | $n_5 = 1.78470$ | $v_5 = 26.1$ |
| $r_9 = -26.914$ | $d_9 = .800$ | $n_6 = 1.78797$ | $v_6 = 47.5$ |
| $r_{10} = 35.068$ | $d_{10} = .000$ | | |
| $r_{11} = 26.268$ | $d_{11} = 1.600$ | $n_7 = 1.80518$ | $v_7 = 25.4$ |
| $r_{12} = 50.543$ | $d_{12} = 15.067$ | | |
| $r_{13} = -19.847$ | $d_{13} = 1.000$ | $n_8 = 1.65160$ | $v_8 = 58.5$ |
| $r_{14} = 32.684$ | $d_{14} = 3.550$ | $n_9 = 1.79631$ | $v_9 = 41.0$ |
| $r_{15} = -52.564$ | $d_{15} = 14.827$ | | |
| $r_{16} = 94.773$ | $d_{16} = 3.800$ | $n_{10} = 1.56883$ | $v_{10} = 56.0$ |
| $r_{17} = -59.165$ | $d_{17} = .200$ | | |
| $r_{18} = 74.562$ | $d_{18} = 6.900$ | $n_{11} = 1.58913$ | $v_{11} = 61.2$ |
| $r_{19} = -27.112$ | $d_{19} = 1.000$ | $n_{12} = 1.79504$ | $v_{12} = 28.6$ |
| $r_{20} = -80.007$ | $d_{20} = .200$ | | |
| $r_{21} = 31.154$ | $d_{21} = 5.450$ | $n_{13} = 1.46450$ | $v_{13} = 65.8$ |
| $r_{22} = -227.133$ | $d_{22} = 6.950$ | | |
| $r_{23} = -150.792$ | $d_{23} = 3.800$ | $n_{14} = 1.74950$ | $v_{14} = 35.2$ |
| $r_{23}' = -61.292$ | $d_{23}' = 2.600$ | $n_{14}' = 1.90265$ | $v_{14}' = 35.8$ |
| $r_{24} = 31.901$ | $d_{24} = 2.550$ | | |
| $r_{25} = 234.710$ | $d_{25} = 2.600$ | $n_{15} = 1.62230$ | $v_{15} = 53.1$ |
| $r_{26} = -44.527$ | $d_{26} = .200$ | | |
| $r_{27} = 44.260$ | $d_{27} = 7.150$ | $n_{16} = 1.51118$ | $v_{16} = 50.9$ |
| $r_{28} = -22.137$ | $d_{28} = .950$ | $n_{17} = 1.78797$ | $v_{17} = 47.5$ |

EXAMPLE 6-continued

| f = 28.8~131 mm | | F = 4.14~4.65 | |
|---|---|---|---|
| $r_{29} = -130.769$ | | | |
| f | 28.800 | 61.423 | 131.000 |
| $d_5$ | .252 | 13.588 | 24.790 |
| $d_{12}$ | 15.067 | 7.040 | 3.808 |
| $d_{15}$ | 14.827 | 9.518 | 1.547 |
| $B_f$ | 40.283 | 53.620 | 64.822 |

$f_1 = 63.638$  $f_1/-f_2 = 3.135$
$f_2 = -20.297$
$f_3 = -83.217$  $f_3/f_2 = 4.100$
$f_4 = 30.445$  $f_4/-f_2 = 1.500$

Figure 5:
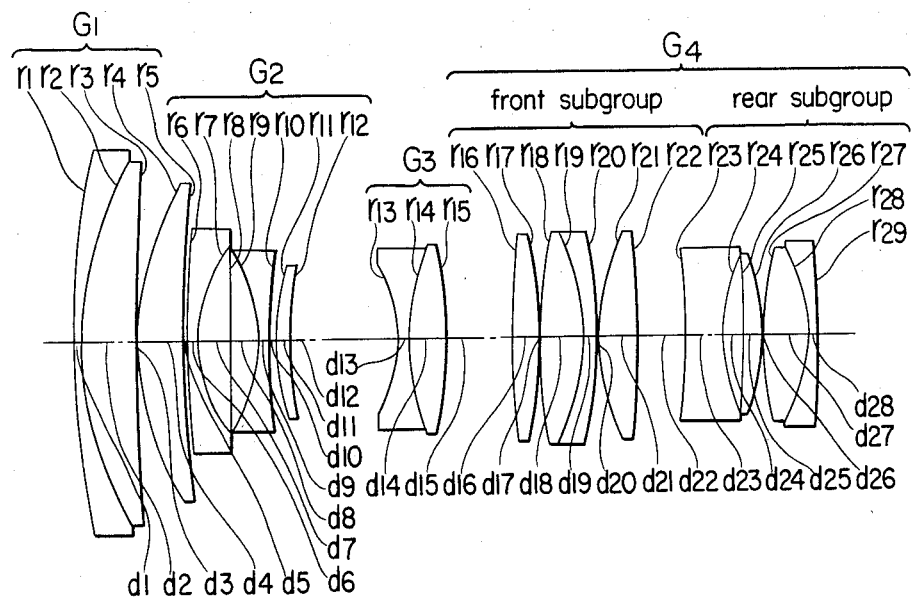
Figure 6A:
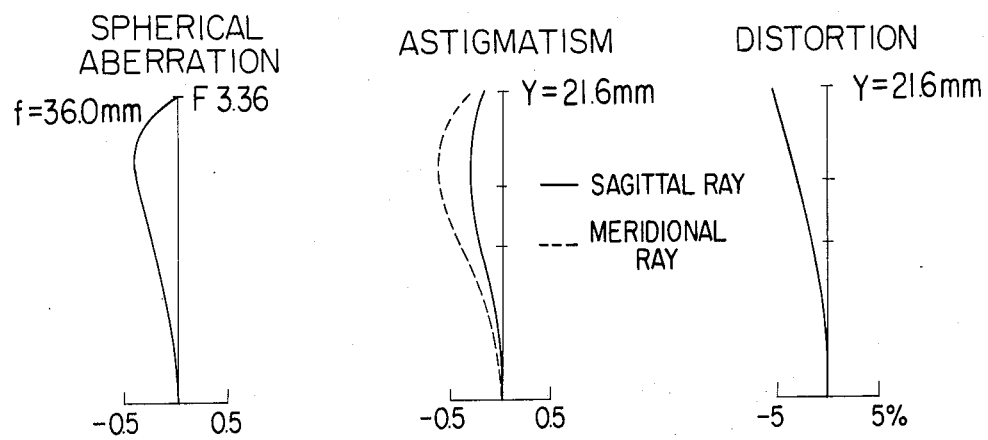
FIGS. 6A, 6B, 6C, 7A, 7B, 7C and 8A, 8B, 8C show various aberrations of the first, second and third embodiments in the position set for infinity.
Figure 6B:
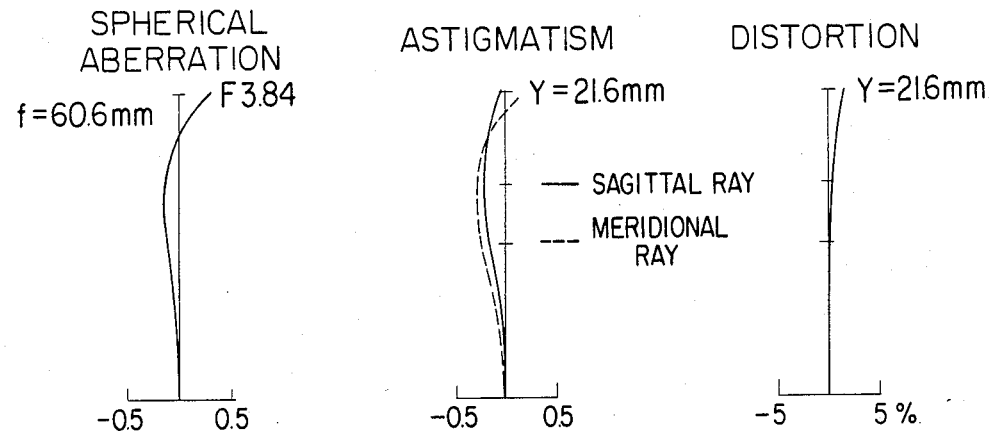
Figure 6C:
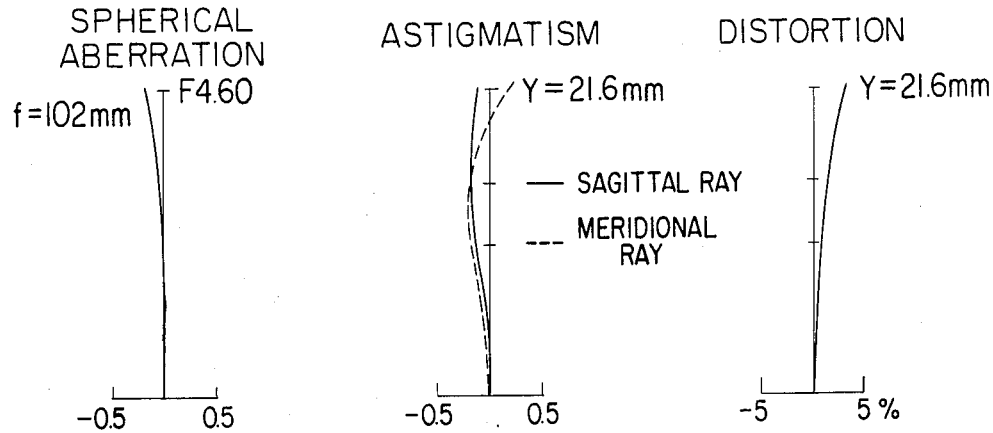
Figure 7A:
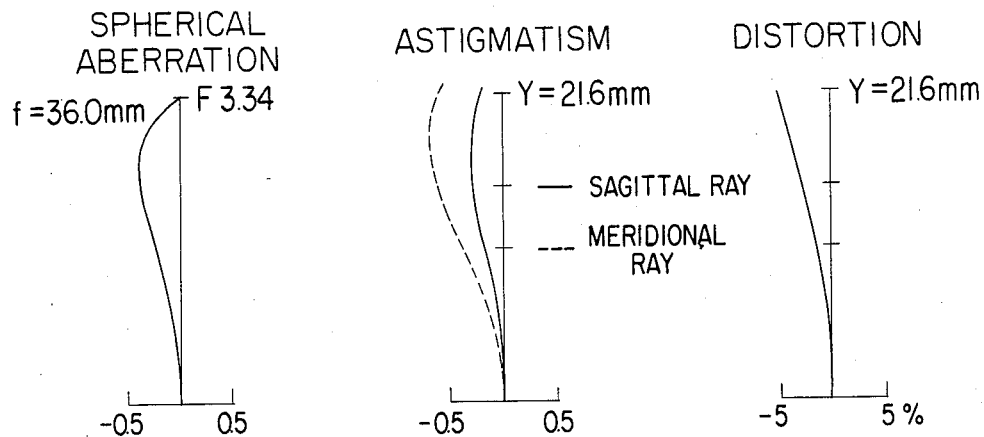
Figure 7B:
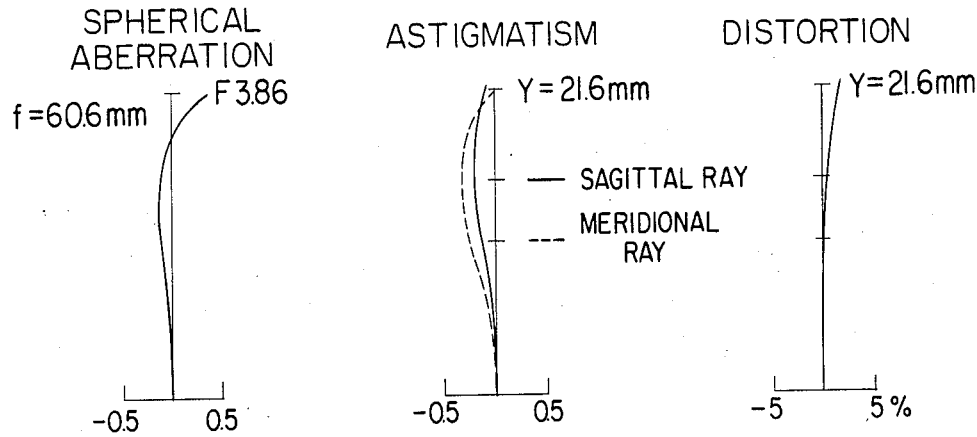
Figure 7C:
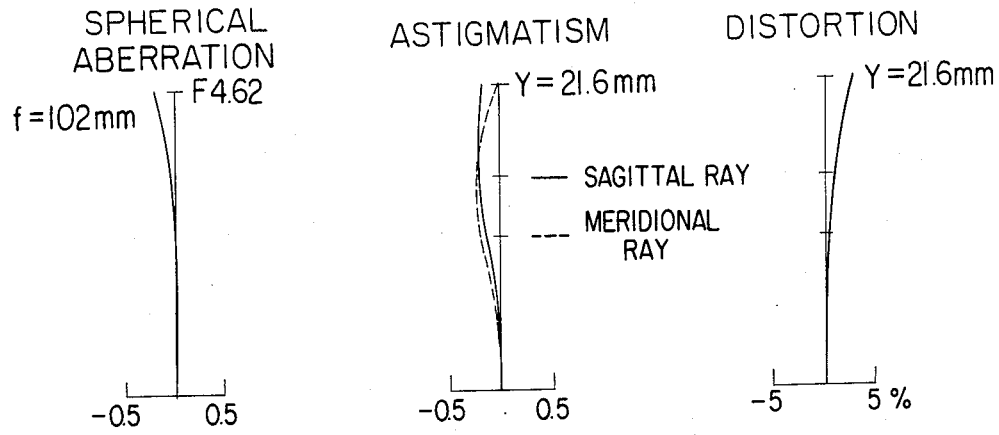
Figure 8A:
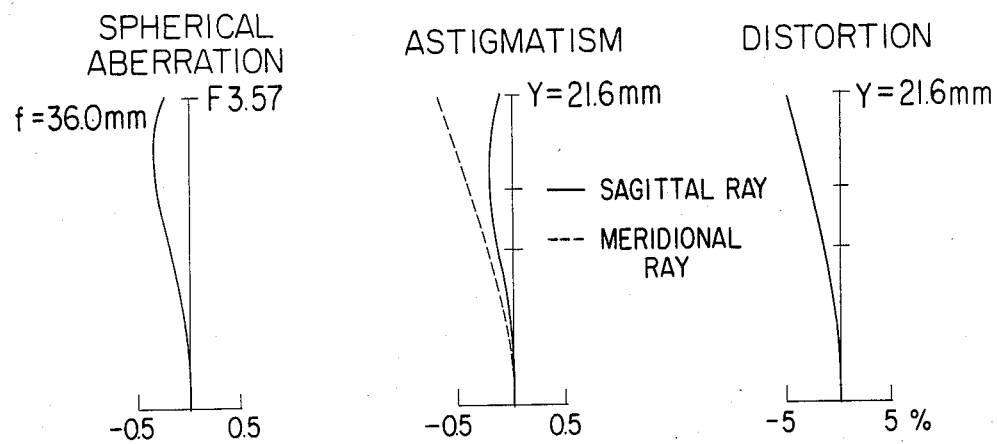
Figure 8B:
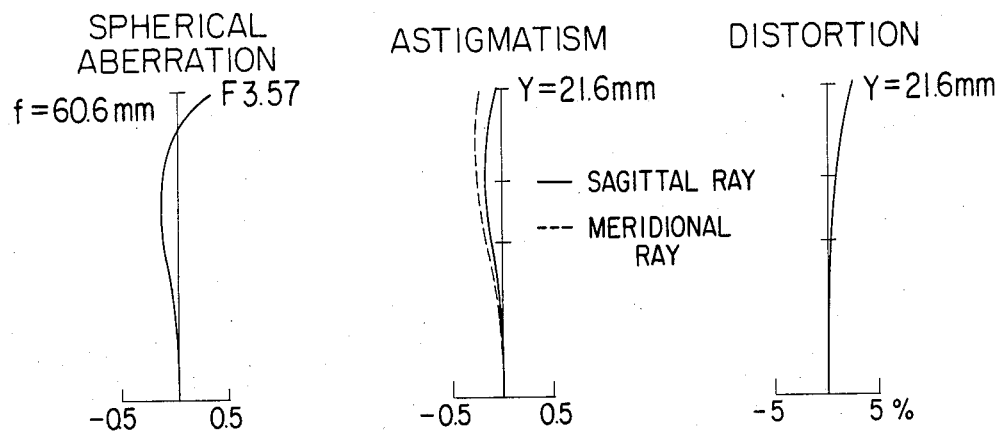
Figure 8C:
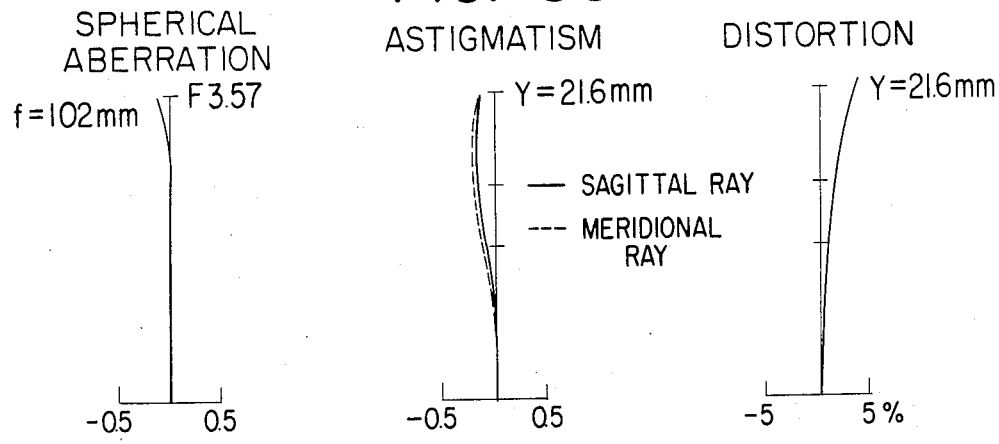
Figure 9:
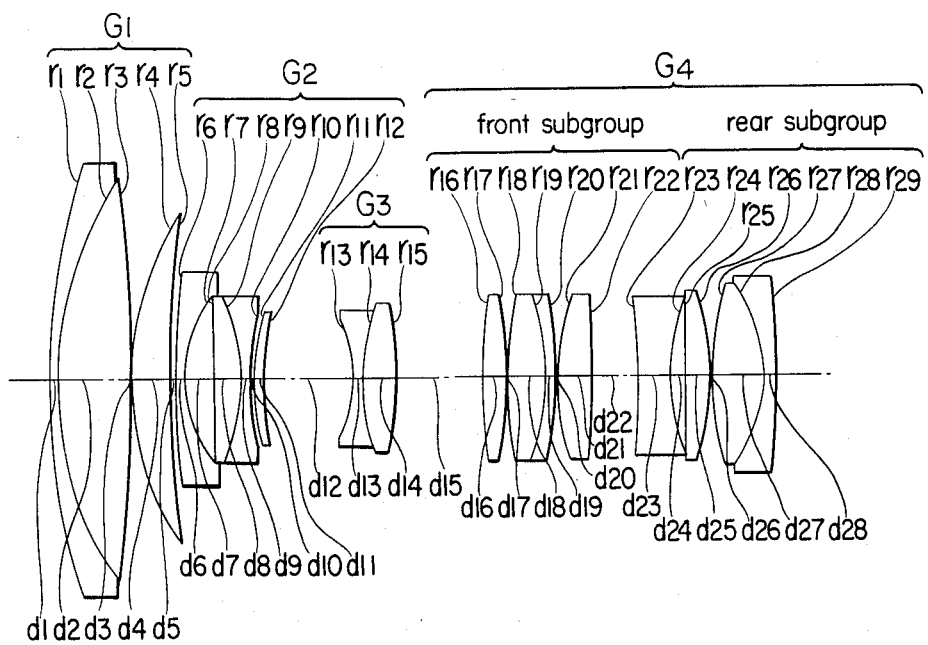
FIGS. 9, 10 and 11 show fourth, fifth and sixth embodiments of the invention.
Figure 10:
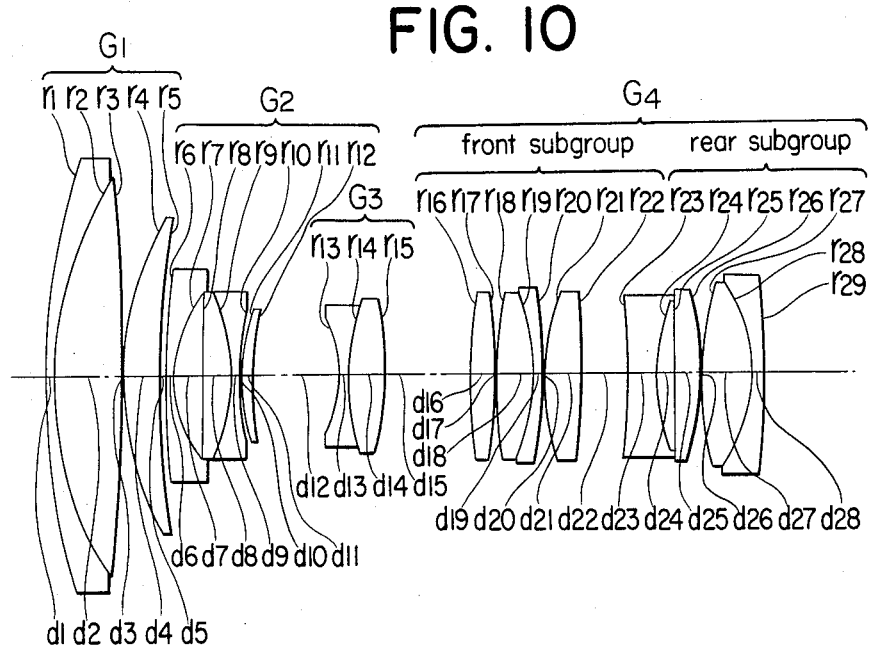
Figure 11:
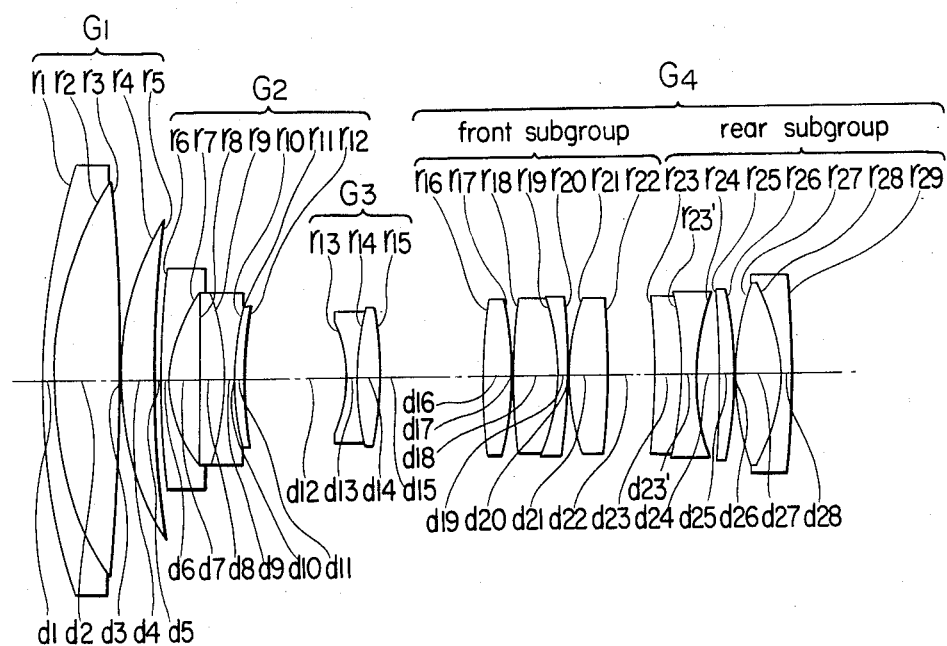
Figure 12A:
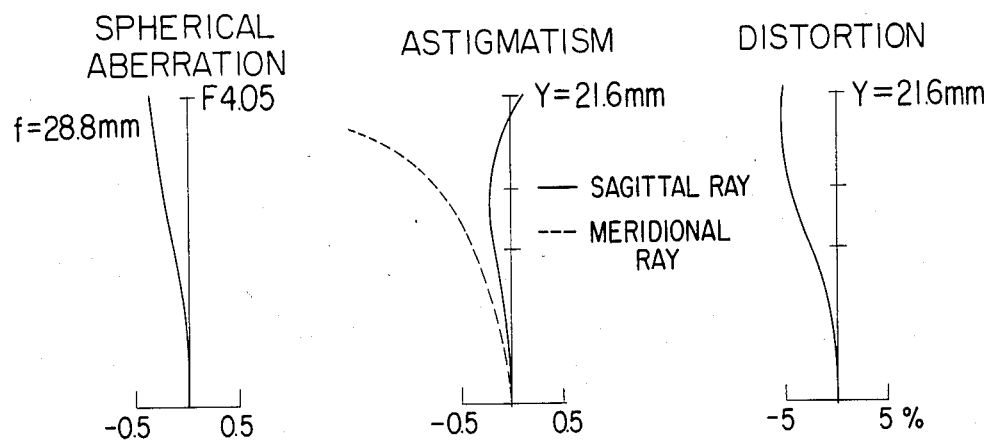
FIGS. 12A, 12B, 12C, 13A, 13B, 13C and 14A, 14B, 14C show various aberrations of the fourth, fifth and sixth embodiments in the position set for infinity.
Figure 12B:
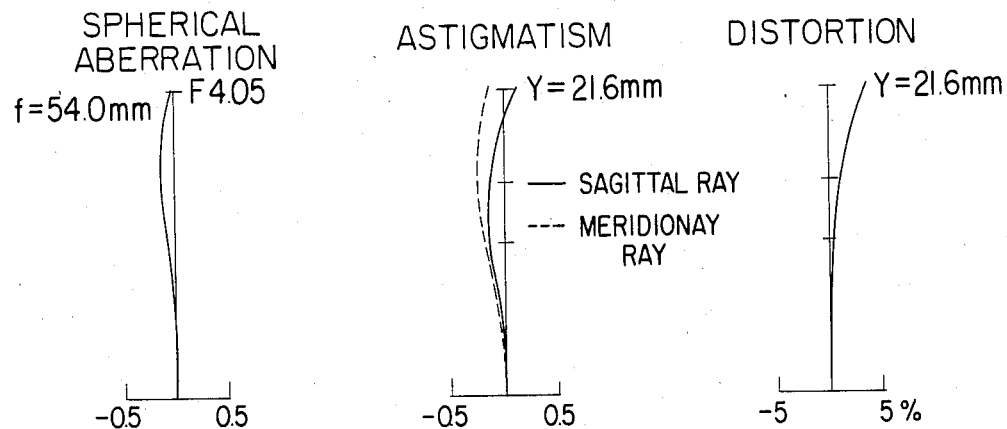
Figure 12C:
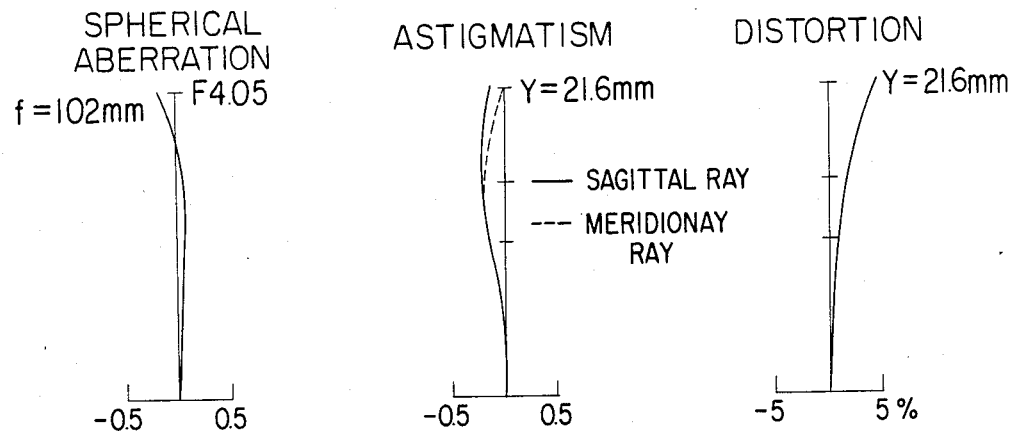
Figure 13A:
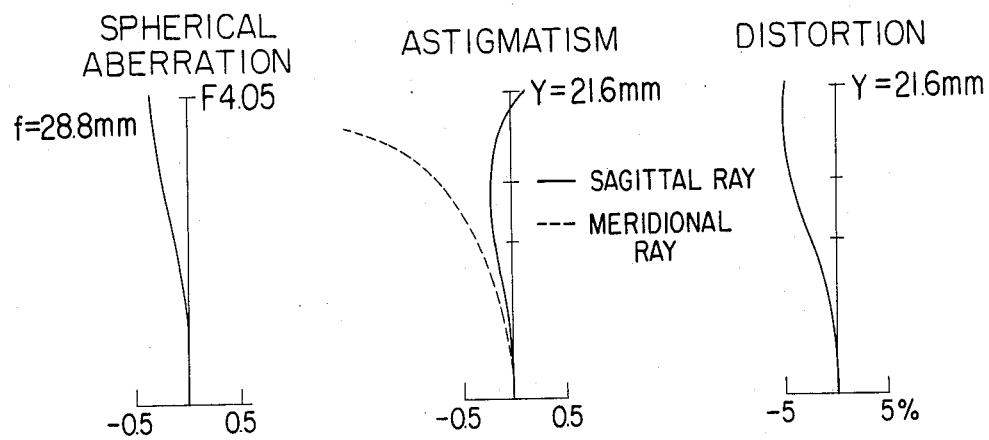
Figure 13B:
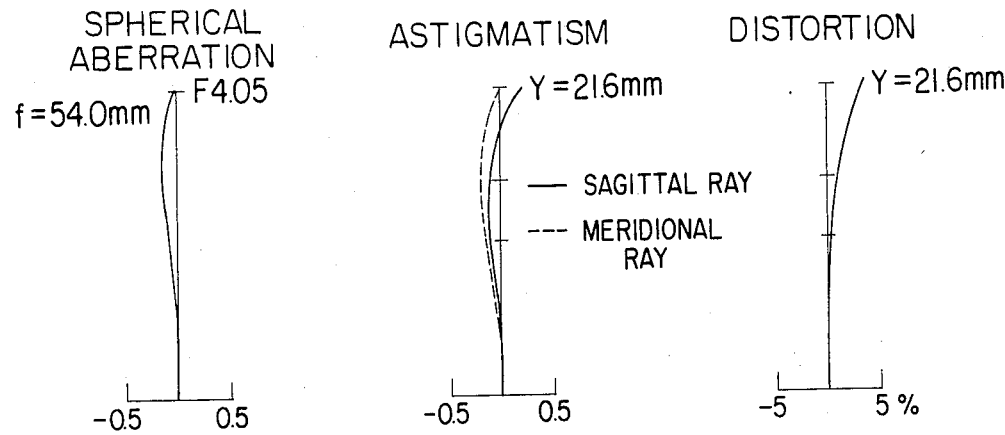
Figure 13C:
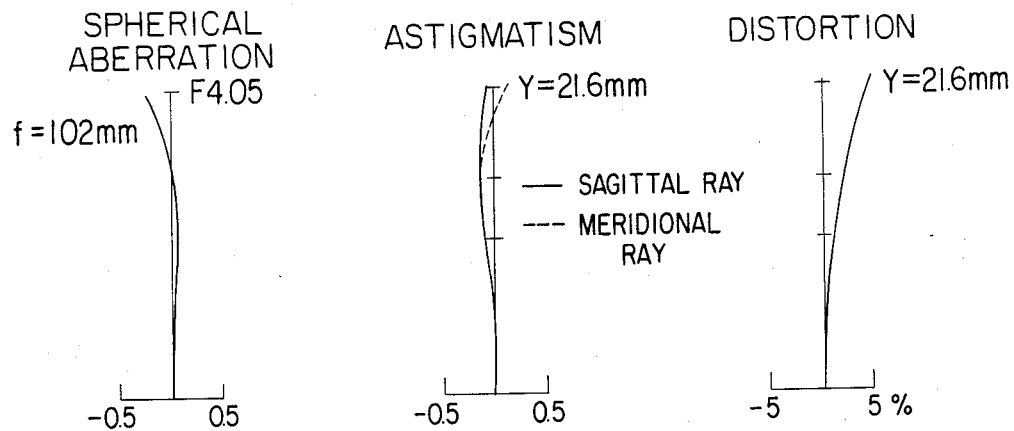
Figure 14A:
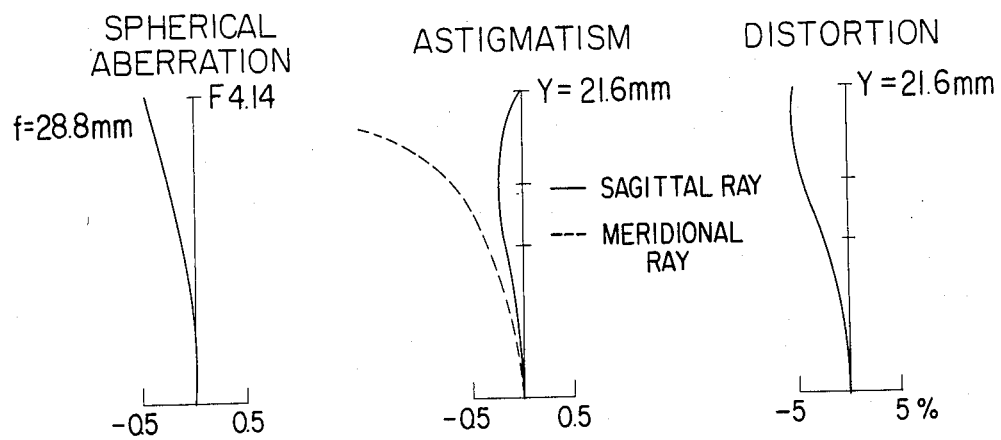
Figure 14B:
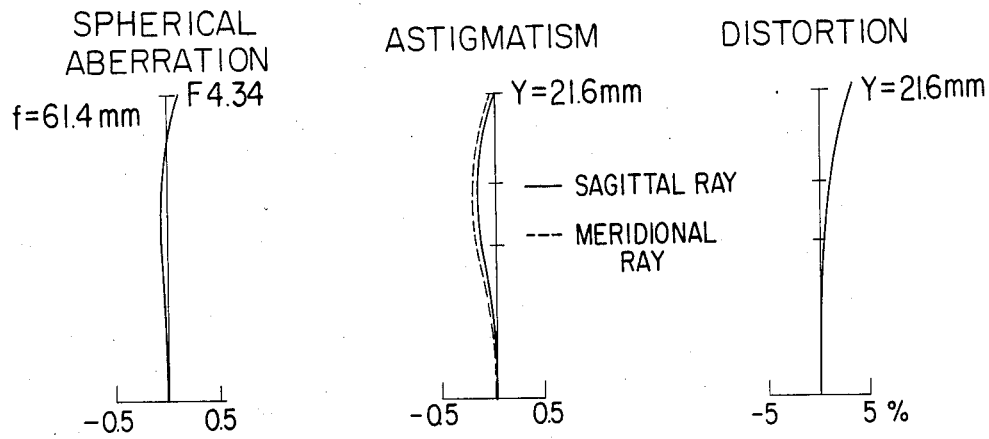
Figure 14C:
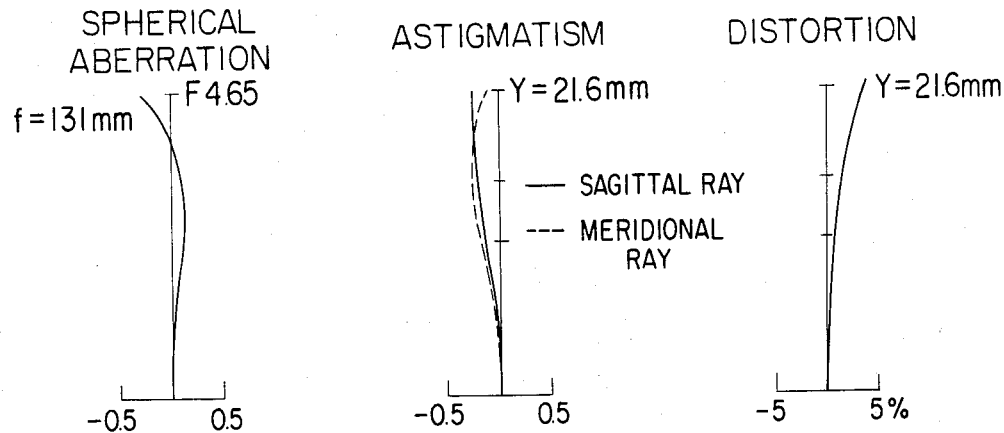

The lens configurations of the above Examples 1 to 3 are shown in FIGS. 3 to 5 and the aberration graphs of the examples are shown in FIGS. 6 to 8. Also, the lens configurations of the above Examples 4 to 6 are shown in FIGS. 9 to 11 and the aberration graphs are shown in FIGS. 12 to 14. The aberrations graphs were all obtained for infinity object distance. The graphs show the spherical aberration, astigmatism and distortion at different zoom positions for the minimum focal length, mid-focal length and maximum focal length. The graphs demonstrate that all of the aberrations have been corrected very well although each of the examples has been designated as a zoom lens having a very small-diameter front lens adaptable for 35 mm single lens reflex cameras.

As readily understood from the foregoing, the present invention enables realization of a zoom lens which has a broad zoom range from wide angle to telephoto and is compact in configuration as a whole in combination with the reduced size of the front lens. The zoom lens is able to exhibit always excellent optical performance throughout the zoom range.

What is claimed is:

1. A zoom lens having a change-magnification range ranging from wide angle to telephoto comprising, in succession from the object side:

a first lens group of positive refractive power movable on the optical axis;

a second lens group of negative refractive power fixed relative to the image plane at a predetermined position;

a third lens group of negative refractive power movable on the optical axis; and a fourth lens group of positive refractive power movable on the optical axis, said first and fourth lens groups being movable toward the object side in linear fashion to change magnification from the wide angle end to the telephoto end while said third lens group being movable toward the object side at the same time in non-linear fashion to keep the image plane at said determined position.

2. A zoom lens according to claim 1, wherein said zoom lens satisfies the following conditions:

$$2.7 < f_1/-f_2 \leq 3.0 \tag{1}$$

$$3.2 < f_3/f_2 < 3.9 \tag{2}$$

$$1.3 < f_4/-f_2 < 1.7 \tag{3}$$

wherein, $f_1$, $f_2$, $f_3$ and $f_4$ are the focal lengths of said first, second, third and fourth lens groups, respectively.

3. A zoom lens according to claim 2, wherein said first lens groups of positive refractive power comprises, in the order from the object side a cemented positive lens and a positive lens and satisfies the condition, $$1.1 < f_{13}/f_1 < 1.6 \quad (4)$$

wherein, $f_{13}$ is the focal length of the positive lens on the image side.

4. A zoom lens according to claim 3, wherein said second lens group of negative refractive power comprises a negative meniscus lens convex toward the object side, a cemented lens of negative refractive power and a positive meniscus lens convex toward the object side and satisfies the following conditions:

$$-2.0 \leq \frac{r_7 + r_6}{r_7 - r_6} \leq -1.0 \quad (5)$$

$$-0.1 < f_{ab}\left(\frac{1}{f_{ava}} + \frac{1}{f_{bvb}}\right) < -0.01 \quad (6)$$

$$3.0 < \frac{r_{12} + r_{11}}{r_{12} - r_{11}} < 20.0 \quad (7)$$

wherein, $r_6, r_7, \ldots, r_{12}$ are curvature radii of respective lens surfaces, the affixed ordinal numbers being from the first lens group side; $f_a$ and $f_b$ are focal lengths of the positive and negative lenses constituting said cemented negative lens; $v_a$ and $v_b$ are Abbe's numbers of the lenses and $f_{ab}$ is the composite focal length thereof.

5. A zoom lens according to claim 4, wherein said third lens group of negative refractive power comprises a biconcave lens and a biconvex lens cemented together and satisfies the condition, $$1.5 < \frac{r_{15} + r_{13}}{r_{15} - r_{13}} < 4.0 \quad (8)$$

wherein, $r_{13}$, $r_{14}$ and $r_{15}$ are curvature radii of respective lens surfaces, the affixed ordinal number being from the second lens group side.

6. A zoom lens according to claim 5, wherein said fourth lens group of positive refractive power includes a front subgroup, in the order from the object side, comprising a biconvex lens, a cemented positive lens and a biconvex lens, the composite power being positive, and a rear subgroup comprising, in the order from the object side, a biconcave lens, a positive lens and a cemented lens of positive refractive power, the composite power of the rear subgroup being negative.

7. A zoom lens according to claim 6, wherein said front subgroup of said fourth lens group satisfies the following conditions:

$$0.002 < \frac{n_{11} - n_{12}}{r_{19}} < 0.02 \quad (9)$$

$$0.4 < \frac{r_{22} + r_{21}}{r_{22} - r_{21}} < 1.0 \quad (10)$$

wherein, $r_{19}$ is the curvature radius of the cemented surface; $n_{11}$ and $n_{12}$ are refractive indexes of the positive and negative lenses before and after said cemented surface; and $r_{21}$ and $r_{22}$ are curvature radii of the rearmost positive lens of said front subgroup, the affixed ordinal numbers being from the object side.

8. A zoom lens according to claim 7, wherein said rear subgroup of said fourth lens group satisfies the following conditions:

$$0.08 < d/f_4 \quad (11)$$

$$-0.9 < \frac{r_{24} + r_{23}}{r_{24} - r_{23}} < -0.4 \quad (12)$$

$$0.002 < \frac{n_{16} - n_{17}}{r_{28}} < 0.02 \quad (13)$$

wherein, $r_{23}$ and $r_{24}$ are curvature radii of said biconcave negative lens on the object side and on the image side, respectively; d is the thickness of the lens; $n_{16}$ and $n_{17}$ are refractive indexes of the positive and negative lenses constituting said cemented positive lens; and $r_{28}$ is the curvature radius of the cemented surface.

9. A zoom lens according to claim 8 which has the numerical data as set forth in the following table:

| f = 36.0~102 mm | | F 3.36~4.60 | |
|---|---|---|---|
| Curvature radius | Lens thickness at the center and spacing between lenses | Refractive index | Abbe's number |
| $r_1$ = 95.772 | $d_1$ = 1.100 | $n_1$ = 1.86074 | $v_1$ = 23.0 |
| $r_2$ = 49.000 | $d_2$ = 5.900 | $n_2$ = 1.56384 | $v_2$ = 60.8 |
| $r_3$ = −8000.000 | $d_3$ = .200 | | |
| $r_4$ = 37.460 | $d_4$ = 5.200 | $n_3$ = 1.61025 | $v_3$ = 56.7 |
| $r_5$ = 202.222 | $d_5$ = .378 | | |
| $r_6$ = 162.000 | $d_6$ = .900 | $n_4$ = 1.79631 | $v_4$ = 41.0 |
| $r_7$ = 17.080 | $d_7$ = 4.300 | | |
| $r_8$ = −800.000 | $d_8$ = 3.500 | $n_5$ = 1.78470 | $v_5$ = 26.1 |
| $r_9$ = −23.000 | $d_9$ = .900 | $n_6$ = 1.78797 | $v_6$ = 47.5 |
| $r_{10}$ = 67.500 | $d_{10}$ = 1.200 | | |
| $r_{11}$ = 27.500 | $d_{11}$ = 1.600 | $n_7$ = 1.78470 | $v_7$ = 26.1 |
| $r_{12}$ = 39.227 | $d_{12}$ = 15.236 | | |
| $r_{13}$ = −19.850 | $d_{13}$ = 1.000 | $n_8$ = 1.69680 | $v_8$ = 55.6 |
| $r_{14}$ = 28.960 | $d_{14}$ = 3.800 | $n_9$ = 1.79631 | $v_9$ = 41.0 |
| $r_{15}$ = −47.254 | $d_{15}$ = 7.566 | | |
| $r_{16}$ = 84.552 | $d_{16}$ = 3.000 | $n_{10}$ = 1.62041 | $v_{10}$ = 60.4 |
| $r_{17}$ = −69.613 | $d_{17}$ = .200 | | |
| $r_{18}$ = 68.528 | $d_{18}$ = 5.500 | $n_{11}$ = 1.60729 | $v_{11}$ = 59.6 |
| $r_{19}$ = −23.930 | $d_{19}$ = .900 | $n_{12}$ = 1.79504 | $v_{12}$ = 28.6 |
| $r_{20}$ = −72.251 | $d_{20}$ = .200 | | |
| $r_{21}$ = 36.118 | $d_{21}$ = 5.100 | $n_{13}$ = 1.62041 | $v_{13}$ = 60.4 |
| $r_{22}$ = −434.489 | $d_{22}$ = 6.300 | | |
| $r_{23}$ = −138.000 | $d_{23}$ = 4.800 | $n_{14}$ = 1.79631 | $v_{14}$ = 41.0 |
| $r_{24}$ = 25.051 | $d_{24}$ = 2.400 | | |
| $r_{25}$ = 191.183 | $d_{25}$ = 2.500 | $n_{15}$ = 1.46450 | $v_{15}$ = 65.8 |
| $r_{26}$ = −41.895 | $d_{26}$ = .200 | | |
| $r_{27}$ = 37.500 | $d_{27}$ = 5.900 | $n_{16}$ = 1.51118 | $v_{16}$ = 50.9 |
| $r_{28}$ = −21.535 | $d_{28}$ = 1.000 | $n_{17}$ = 1.79668 | $v_{17}$ = 45.5 |
| $r_{29}$ = −118.497 | | | |
| f | 36.000 | 60.596 | 101.999 |
| $d_5$ | .378 | 9.622 | 17.933 |
| $d_{12}$ | 15.236 | 8.495 | 3.810 |
| $d_{15}$ | 7.566 | 5.063 | 1.438 |
| Bf | 46.929 | 56.173 | 64.483 |
| $f_1$ = 61.495 | | $f_1/-f_2$ = 2.872 | |
| $f_2$ = −21.410 | | | |
| $f_3$ = −75.361 | | $f_3/f_2$ = 3.520 | |
| $f_4$ = 28.261 | | $f_4/-f_2$ = 1.320 | |

10. A zoom lens according to claim 8 which has the numerical data as set forth in the following table:

| f = 36.0~102 mm | F 3.34~4.62 |
|---|---|
| Lens thickness at the center and | |

-continued

| f = 36.0~102 mm | | F 3.34~4.62 | |
|---|---|---|---|
| Curvature radius | spacing between lenses | Refractive index | Abbe's number |
| $r_1 = 96.162$ | $d_1 = 1.100$ | $n_1 = 1.86074$ | $\nu_1 = 23.0$ |
| $r_2 = 48.600$ | $d_2 = 5.800$ | $n_2 = 1.62280$ | $\nu_2 = 57.0$ |
| $r_3 = 791.454$ | $d_3 = .200$ | | |
| $r_4 = 38.500$ | $d_4 = 5.200$ | $n_3 = 1.62041$ | $\nu_3 = 60.3$ |
| $r_5 = 201.163$ | $d_5 = .346$ | | |
| $r_6 = 145.000$ | $d_6 = .900$ | $n_4 = 1.84042$ | $\nu_4 = 43.3$ |
| $r_7 = 17.132$ | $d_7 = 4.300$ | | |
| $r_8 = -293.874$ | $d_8 = 3.200$ | $n_5 = 1.80518$ | $\nu_5 = 25.4$ |
| $r_9 = -24.200$ | $d_9 = .900$ | $n_6 = 1.78797$ | $\nu_6 = 47.5$ |
| $r_{10} = 93.157$ | $d_{10} = 1.300$ | | |
| $r_{11} = 26.000$ | $d_{11} = 1.700$ | $n_7 = 1.80518$ | $\nu_7 = 25.4$ |
| $r_{12} = 34.047$ | $d_{12} = 15.248$ | | |
| $r_{13} = -19.458$ | $d_{13} = 1.000$ | $n_8 = 1.69680$ | $\nu_8 = 55.6$ |
| $r_{14} = 29.430$ | $d_{14} = 3.800$ | $n_9 = 1.79631$ | $\nu_9 = 41.0$ |
| $r_{15} = -45.453$ | $d_{15} = 7.529$ | | |
| $r_{16} = 82.943$ | $d_{16} = 3.000$ | $n_{10} = 1.62041$ | $\nu_{10} = 60.3$ |
| $r_{17} = -70.737$ | $d_{17} = .200$ | | |
| $r_{18} = 69.486$ | $d_{18} = 5.500$ | $n_{11} = 1.62299$ | $\nu_{11} = 58.2$ |
| $r_{19} = -23.703$ | $d_{19} = .900$ | $n_{12} = 1.79504$ | $\nu_{12} = 28.6$ |
| $r_{20} = -77.225$ | $d_{20} = .200$ | | |
| $r_{21} = 36.035$ | $d_{21} = 5.200$ | $n_{13} = 1.62041$ | $\nu_{13} = 60.3$ |
| $r_{22} = -466.547$ | $d_{22} = 6.400$ | | |
| $r_{23} = -159.000$ | $d_{23} = 4.000$ | $n_{14} = 1.87739$ | $\nu_{14} = 38.1$ |
| $r_{24} = 26.496$ | $d_{24} = 2.400$ | | |
| $r_{25} = 156.352$ | $d_{25} = 2.500$ | $n_{15} = 1.51680$ | $\nu_{15} = 64.1$ |
| $r_{26} = -42.344$ | $d_{26} = .200$ | | |
| $r_{27} = 40.144$ | $d_{27} = 5.900$ | $n_{16} = 1.54814$ | $\nu_{16} = 45.9$ |
| $r_{28} = -20.693$ | $d_{28} = 1.000$ | $n_{17} = 1.79668$ | $\nu_{17} = 45.5$ |
| $r_{29} = -181.842$ | | | |

| f | 36.000 | 60.596 | 101.999 |
|---|---|---|---|
| $d_5$ | .346 | 9.590 | 17.901 |
| $d_{12}$ | 15.249 | 8.507 | 3.822 |
| $d_{15}$ | 7.529 | 5.026 | 1.401 |
| $B_f$ | 47.562 | 56.805 | 65.116 |

| $f_1 = 61.495$ | $f_1/-f_2 = 2.872$ |
|---|---|
| $f_2 = -21.410$ | |
| $f_3 = -75.361$ | $f_3/f_2 = 3.520$ |
| $f_4 = 28.261$ | $f_4/-f_2 = 1.320$ |

11. A zoom lens according to claim 8 which has the numerical data as set forth in the following table:

| f = 36.0~102 mm | | F 3.57 | |
|---|---|---|---|
| Curvature radius | Lens thickness at the center and spacing between lenses | Refractive index | Abbe's number |
| $r_1 = 126.000$ | $d_1 = 1.200$ | $n_1 = 1.86074$ | $\nu_1 = 23.0$ |
| $r_2 = 53.800$ | $d_2 = 8.500$ | $n_2 = 1.56883$ | $\nu_2 = 56.0$ |
| $r_3 = -715.000$ | $d_3 = .200$ | | |
| $r_4 = 43.500$ | $d_4 = 6.600$ | $n_3 = 1.69350$ | $\nu_3 = 53.8$ |
| $r_5 = 227.997$ | $d_5 = .610$ | | |
| $r_6 = 198.000$ | $d_6 = .900$ | $n_4 = 1.84042$ | $\nu_4 = 43.3$ |
| $r_7 = 19.300$ | $d_7 = 5.000$ | | |
| $r_8 = 684.623$ | $d_8 = 4.400$ | $n_5 = 1.78470$ | $\nu_5 = 26.1$ |
| $r_9 = -23.800$ | $d_9 = .900$ | $n_6 = 1.78797$ | $\nu_6 = 47.5$ |
| $r_{10} = 82.500$ | $d_{10} = .900$ | | |
| $r_{11} = 26.000$ | $d_{11} = 1.800$ | $n_7 = 1.80518$ | $\nu_7 = 25.4$ |
| $r_{12} = 30.823$ | $d_{12} = 16.389$ | | |
| $r_{13} = -21.780$ | $d_{13} = 1.000$ | $n_8 = 1.69350$ | $\nu_8 = 53.8$ |
| $r_{14} = 32.384$ | $d_{14} = 5.400$ | $n_9 = 1.79631$ | $\nu_9 = 41.0$ |
| $r_{15} = -53.850$ | $d_{15} = 9.570$ | | |
| $r_{16} = 99.366$ | $d_{16} = 3.800$ | $n_{10} = 1.62041$ | $\nu_{10} = 60.4$ |
| $r_{17} = -74.780$ | $d_{17} = .200$ | | |
| $r_{18} = 77.588$ | $d_{18} = 7.100$ | $n_{11} = 1.56384$ | $\nu_{11} = 60.8$ |
| $r_{19} = -27.224$ | $d_{19} = 1.000$ | $n_{12} = 1.79504$ | $\nu_{12} = 28.6$ |
| $r_{20} = -67.643$ | $d_{20} = .200$ | | |
| $r_{21} = 32.846$ | $d_{21} = 5.600$ | $n_{13} = 1.48749$ | $\nu_{13} = 70.2$ |
| $r_{22} = -265.336$ | $d_{22} = 7.100$ | | |
| $r_{23} = -151.036$ | $d_{23} = 5.500$ | $n_{14} = 1.80454$ | $\nu_{14} = 39.6$ |
| $r_{24} = 29.181$ | $d_{24} = 2.600$ | | |
| $r_{25} = 690.119$ | $d_{25} = 2.700$ | $n_{15} = 1.62041$ | $\nu_{15} = 60.4$ |
| $r_{26} = -50.204$ | $d_{26} = .200$ | | |
| $r_{27} = 41.405$ | $d_{27} = 7.100$ | $n_{16} = 1.51118$ | $\nu_{16} = 50.9$ |
| $r_{28} = -22.753$ | $d_{28} = 1.000$ | $n_{17} = 1.78797$ | $\nu_{17} = 47.5$ |
| $r_{29} = -149.953$ | | | |

| f | 36.000 | 60.597 | 102.000 |
|---|---|---|---|
| $d_5$ | .610 | 10.380 | 19.153 |
| $d_{12}$ | 16.389 | 10.103 | 5.687 |
| $d_{15}$ | 9.570 | 6.086 | 1.728 |
| $B_f$ | 47.438 | 57.208 | 65.981 |

| $f_1 = 65.935$ | $f_1/-f_2 = 2.912$ |
|---|---|
| $f_2 = -22.640$ | |
| $f_3 = -81.504$ | $f_3/f_2 = 3.600$ |
| $f_4 = 31.288$ | $f_4/-f_2 = 1.382$ |

12. A zoom lens having a change-magnification range ranging from wide angle to telephoto comprising, in the order from the object side;

a first lens group of positive refractive power movable on the optical axis;

a second lens group of negative refractive power fixed relative to the image plane at a determined position;

a third lens group of negative refractive power movable on the optical axis; and a fourth lens group of positive refractive power movable on the optical axis, said first and fourth positive lens groups being movable toward the object side in linear fashion to change magnification from the wide angle end to the telephoto end while said negative lens group being movable toward the object side in non-linear fashion to keep the image plane at said determined position, and said zoom lens satisfying the following conditions:

$$3.0 < f_1/-f_2 < 3.3 \tag{1'}$$

$$3.9 \leq f_3/f_2 < 4.4 \tag{2'}$$

$$1.3 < f_4/-f_2 < 1.7 \tag{3'}$$

wherein, $f_1$, $f_2$, $f_3$ and $f_4$ are focal lengths of the first, second, third and fourth lens groups, respectively.

13. A zoom lens according to claim 12, wherein said first lens group of positive refractive power comprises, in the order from the object side, a cemented positive lens and a positive lens and satisfies the condition, $$1.05 < f_{13}/f_1 < 1.5 \tag{4'}$$

wherein, $f_{13}$ is the focal length of the positive lens on the image side.

14. A zoom lens according to claim 13, wherein said second lens group of negative refractive power comprises a negative meniscus lens convex toward the object side, a cemented lens of negative refractive power and a positive meniscus lens convex toward the object side, and satisfies the following conditions:

$$-2.0 \leq \frac{r_7 + r_6}{r_7 - r_6} \leq -1.0 \tag{5'}$$

$$-0.1 < f_{ab}\left(\frac{1}{f_{ava}} + \frac{1}{f_{bvb}}\right) < 0 \tag{6'}$$

-continued $$1.5 < \frac{r_{12} + r_{11}}{r_{12} - r_{11}} < 10 \quad (7')$$

wherein, $r_6, r_7, \ldots, r_{12}$ are the curvature radii of the above-mentioned lens surfaces, the affixed ordinal numbers being from the first lens group side; $f_a$ and $f_b$ are focal lengths of the positive and negative lenses constituting said cemented negative lens, $\nu_a$ and $\nu_b$ are Abbe's numbers of the lenses; and $f_{ab}$ is the composite focal length thereof.

15. A zoom lens according to claim 14 which has the numerical data as set forth in the following table:

| Curvature radius | Lens thickness at the center and spacing between lenses | Refractive index | Abbe's number |
|---|---|---|---|
| $r_1 = 120.000$ | $d_1 = 1.100$ | $n_1 = 1.86074$ | $\nu_1 = 23.0$ |
| $r_2 = 56.000$ | $d_2 = 9.800$ | $n_2 = 1.51860$ | $\nu_2 = 70.1$ |
| $r_3 = -335.000$ | $d_3 = .200$ | | |
| $r_4 = 39.380$ | $d_4 = 5.900$ | $n_3 = 1.74810$ | $\nu_3 = 52.3$ |
| $r_5 = 145.652$ | $d_5 = .347$ | | |
| $r_6 = 133.863$ | $d_6 = .800$ | $n_4 = 1.90265$ | $\nu_4 = 35.8$ |
| $r_7 = 16.680$ | $d_7 = 4.600$ | | |
| $r_8 = 250.000$ | $d_8 = 4.300$ | $n_5 = 1.80518$ | $\nu_5 = 25.4$ |
| $r_9 = -22.400$ | $d_9 = .800$ | $n_6 = 1.77279$ | $\nu_6 = 49.4$ |
| $r_{10} = 43.787$ | $d_{10} = .200$ | | |
| $r_{11} = 24.096$ | $d_{11} = 1.500$ | $n_7 = 1.80518$ | $\nu_7 = 25.4$ |
| $r_{12} = 35.680$ | $d_{12} = 13.196$ | | |
| $r_{13} = -18.970$ | $d_{13} = 1.000$ | $n_8 = 1.69350$ | $\nu_8 = 53.8$ |
| $r_{14} = 31.000$ | $d_{14} = 5.300$ | $n_9 = 1.79631$ | $\nu_9 = 41.0$ |
| $r_{15} = -43.440$ | $d_{15} = 12.186$ | | |
| $r_{16} = 89.634$ | $d_{16} = 3.400$ | $n_{10} = 1.62041$ | $\nu_{10} = 60.3$ |
| $r_{17} = -71.095$ | $d_{17} = .200$ | | |
| $r_{18} = 70.847$ | $d_{18} = 5.800$ | $n_{11} = 1.56384$ | $\nu_{11} = 60.8$ |
| $r_{19} = -25.131$ | $d_{19} = .900$ | $n_{12} = 1.79504$ | $\nu_{12} = 28.6$ |
| $r_{20} = -63.760$ | $d_{20} = .200$ | | |
| $r_{21} = 28.913$ | $d_{21} = 5.200$ | $n_{13} = 1.46450$ | $\nu_{13} = 65.8$ |
| $r_{22} = -281.627$ | $d_{22} = 6.600$ | | |
| $r_{23} = -179.055$ | $d_{23} = 4.900$ | $n_{14} = 1.90265$ | $\nu_{14} = 35.8$ |
| $r_{24} = 28.281$ | $d_{24} = 2.100$ | | |
| $r_{25} = 183.000$ | $d_{25} = 3.600$ | $n_{15} = 1.51454$ | $\nu_{15} = 54.6$ |
| $r_{26} = -35.445$ | $d_{26} = .200$ | | |
| $r_{27} = 36.991$ | $d_{27} = 8.000$ | $n_{16} = 1.51118$ | $\nu_{16} = 50.9$ |
| $r_{28} = -21.003$ | $d_{28} = .900$ | $n_{17} = 1.78797$ | $\nu_{17} = 47.5$ |
| $r_{29} = -258.281$ | | | |

| f | 28.800 | 54.011 | 102.000 |
|---|---|---|---|
| $d_5$ | .347 | 10.882 | 20.229 |
| $d_{12}$ | 13.196 | 7.288 | 3.783 |
| $d_{15}$ | 12.186 | 7.559 | 1.717 |
| $B_f$ | 38.357 | 48.891 | 58.239 |

| $f_1 = 59.924$ | $f_1/-f_2 = 3.039$ |
|---|---|
| $f_2 = -19.716$ | |
| $f_3 = -79.060$ | $f_3/f_2 = 4.010$ |
| $f_4 = 28.884$ | $f_4/-f_2 = 1.465$ |

16. A zoom lens according to claim 14 which has the numerical data as set forth in the following table:

$f = 28.8 \sim 102$ mm, $F = 4.05$

| Curvature radius | Lens thickness at the center and spacing between lenses | Refractive index | Abbe's number |
|---|---|---|---|
| $r_1 = 115.600$ | $d_1 = 1.100$ | $n_1 = 1.90837$ | $\nu_1 = 23.2$ |
| $r_2 = 55.900$ | $d_2 = 9.800$ | $n_2 = 1.51860$ | $\nu_2 = 70.1$ |
| $r_3 = -334.000$ | $d_3 = .200$ | | |
| $r_4 = 39.185$ | $d_4 = 5.900$ | $n_3 = 1.74810$ | $\nu_3 = 52.3$ |
| $r_5 = 147.595$ | $d_5 = .437$ | | |
| $r_6 = 134.500$ | $d_6 = .800$ | $n_4 = 1.90265$ | $\nu_4 = 35.8$ |
| $r_7 = 16.700$ | $d_7 = 4.600$ | | |
| $r_8 = 280.000$ | $d_8 = 4.300$ | $n_5 = 1.80518$ | $\nu_5 = 25.4$ |
| $r_9 = -22.400$ | $d_9 = .800$ | $n_6 = 1.77279$ | $\nu_6 = 49.4$ |
| $r_{10} = 43.050$ | $d_{10} = .200$ | | |
| $r_{11} = 24.520$ | $d_{11} = 1.500$ | $n_7 = 1.80518$ | $\nu_7 = 25.4$ |
| $r_{12} = 37.636$ | $d_{12} = 13.117$ | | |
| $r_{13} = -19.040$ | $d_{13} = 1.000$ | $n_8 = 1.69350$ | $\nu_8 = 53.8$ |
| $r_{14} = 31.000$ | $d_{14} = 5.300$ | $n_9 = 1.79631$ | $\nu_9 = 41.0$ |
| $r_{15} = -43.707$ | $d_{15} = 12.227$ | | |
| $r_{16} = 89.600$ | $d_{16} = 3.400$ | $n_{10} = 1.62041$ | $\nu_{10} = 60.4$ |
| $r_{17} = -71.400$ | $d_{17} = .200$ | | |
| $r_{18} = 71.013$ | $d_{18} = 5.800$ | $n_{11} = 1.56384$ | $\nu_{11} = 60.8$ |
| $r_{19} = -25.131$ | $d_{19} = .900$ | $n_{12} = 1.79504$ | $\nu_{12} = 28.6$ |
| $r_{20} = -63.932$ | $d_{20} = .200$ | | |
| $r_{21} = 28.859$ | $d_{21} = 5.200$ | $n_{13} = 1.46450$ | $\nu_{13} = 65.8$ |
| $r_{22} = -272.280$ | $d_{22} = 6.600$ | | |
| $r_{23} = -182.586$ | $d_{23} = 4.900$ | $n_{14} = 1.87739$ | $\nu_{14} = 38.1$ |
| $r_{24} = 27.644$ | $d_{24} = 2.100$ | | |
| $r_{25} = 199.205$ | $d_{25} = 3.600$ | $n_{15} = 1.51860$ | $\nu_{15} = 70.1$ |
| $r_{26} = -36.907$ | $d_{26} = .200$ | | |
| $r_{27} = 36.980$ | $d_{27} = 8.000$ | $n_{16} = 1.51118$ | $\nu_{16} = 50.9$ |
| $r_{28} = -21.004$ | $d_{28} = .900$ | $n_{17} = 1.78797$ | $\nu_{17} = 47.5$ |
| $r_{29} = -233.437$ | | | |

| f | 28.800 | 54.011 | 102.000 |
|---|---|---|---|
| $d_5$ | .437 | 10.972 | 20.319 |
| $d_{12}$ | 13.117 | 7.209 | 3.704 |
| $d_{15}$ | 12.227 | 7.599 | 1.758 |
| $B_f$ | 38.312 | 48.846 | 58.193 |

| $f_1 = 59.924$ | $f_1/-f_2 = 3.039$ |
|---|---|
| $f_2 = -19.716$ | |
| $f_3 = -79.060$ | $f_3/f_2 = 4.010$ |
| $f_4 = 28.884$ | $f_4/-f_2 = 1.465$ |

17. A zoom lens according to claim 14 which has the numerical data as set forth in the following table:

$f = 28.8 \sim 131$ mm, $F = 4.14 \sim 4.65$

| Curvature radius | Lens thickness at the center and spacing between lenses | Refractive index | Abbe's number |
|---|---|---|---|
| $r_1 = 124.332$ | $d_1 = 1.100$ | $n_1 = 1.86074$ | $\nu_1 = 23.0$ |
| $r_2 = 56.300$ | $d_2 = 9.600$ | $n_2 = 1.56384$ | $\nu_2 = 60.8$ |
| $r_3 = -390.000$ | $d_3 = .200$ | | |
| $r_4 = 40.000$ | $d_4 = 5.500$ | $n_3 = 1.69680$ | $\nu_3 = 55.6$ |
| $r_5 = 141.068$ | $d_5 = .251$ | | |
| $r_6 = 120.614$ | $d_6 = .800$ | $n_4 = 1.87739$ | $\nu_4 = 38.1$ |
| $r_7 = 17.104$ | $d_7 = 4.600$ | | |
| $r_8 = 178.353$ | $d_8 = 4.200$ | $n_5 = 1.78470$ | $\nu_5 = 26.1$ |
| $r_9 = -26.914$ | $d_9 = .800$ | $n_6 = 1.78797$ | $\nu_6 = 47.5$ |
| $r_{10} = 35.068$ | $d_{10} = .000$ | | |
| $r_{11} = 26.268$ | $d_{11} = 1.600$ | $n_7 = 1.80518$ | $\nu_7 = 25.4$ |
| $r_{12} = 50.543$ | $d_{12} = 15.067$ | | |
| $r_{13} = -19.847$ | $d_{13} = 1.000$ | $n_8 = 1.65160$ | $\nu_8 = 58.5$ |
| $r_{14} = 32.684$ | $d_{14} = 3.550$ | $n_9 = 1.79631$ | $\nu_9 = 41.0$ |
| $r_{15} = -52.564$ | $d_{15} = 14.827$ | | |
| $r_{16} = 94.773$ | $d_{16} = 3.800$ | $n_{10} = 1.56883$ | $\nu_{10} = 56.0$ |
| $r_{17} = -59.165$ | $d_{17} = .200$ | | |
| $r_{18} = 74.562$ | $d_{18} = 6.900$ | $n_{11} = 1.58913$ | $\nu_{11} = 61.2$ |
| $r_{19} = -27.112$ | $d_{19} = 1.000$ | $n_{12} = 1.79504$ | $\nu_{12} = 28.6$ |
| $r_{20} = -80.007$ | $d_{20} = .200$ | | |
| $r_{21} = 31.154$ | $d_{21} = 5.450$ | $n_{13} = 1.46450$ | $\nu_{13} = 65.8$ |
| $r_{22} = -227.133$ | $d_{22} = 6.950$ | | |
| $r_{23} = -150.792$ | $d_{23} = 3.800$ | $n_{14} = 1.74950$ | $\nu_{14} = 35.2$ |
| $r_{23}' = -61.292$ | $d_{23}' = 2.600$ | $n_{14}' = 1.90265$ | $\nu_{14}' = 35.8$ |
| $r_{24} = 31.901$ | $d_{24} = 2.550$ | | |
| $r_{25} = 243.710$ | $d_{25} = 2.600$ | $n_{15} = 1.62230$ | $\nu_{15} = 53.1$ |
| $r_{26} = -44.527$ | $d_{26} = .200$ | | |
| $r_{27} = 44.260$ | $d_{27} = 7.150$ | $n_{16} = 1.51118$ | $\nu_{16} = 50.9$ |
| $r_{28} = -22.137$ | $d_{28} = .950$ | $n_{17} = 1.78797$ | $\nu_{17} = 47.5$ |
| $r_{29} = -130.769$ | | | |

| f | 28.800 | 61.423 | 131.000 |
|---|---|---|---|
| $d_5$ | .252 | 13.588 | 24.790 |
| $d_{12}$ | 15.067 | 7.040 | 3.808 |
| $d_{15}$ | 14.827 | 9.518 | 1.547 |
| $B_f$ | 40.283 | 53.620 | 64.822 |

| $f_1 = 63.638$ | $f_1/-f_2 = 3.135$ |
|---|---|
| $f_2 = -20.297$ | |
| $f_3 = -83.217$ | $f_3/f_2 = 4.100$ |
| $f_4 = 30.445$ | $f_4/-f_2 = 1.500$ |

* * * * *